(12) United States Patent
Levi et al.

(10) Patent No.: US 12,268,224 B2
(45) Date of Patent: Apr. 8, 2025

(54) REFRIGERATOR ICE-CREAM DISPENSER AND MATCHING CAPSULES

(71) Applicants: Jossef Levi, Ramat Hasharon (IL); Aviva Cohen, Petach-Tikva (IL)

(72) Inventors: Jossef Levi, Ramat Hasharon (IL); Aviva Cohen, Petach-Tikva (IL)

( * ) Notice: Subject to any disclaimer, the term of this patent is extended or adjusted under 35 U.S.C. 154(b) by 235 days.

(21) Appl. No.: 17/801,273

(22) PCT Filed: Feb. 10, 2021

(86) PCT No.: PCT/IL2021/050157
§ 371 (c)(1),
(2) Date: Aug. 22, 2022

(87) PCT Pub. No.: WO2021/199019
PCT Pub. Date: Oct. 7, 2021

(65) Prior Publication Data
US 2023/0104361 A1    Apr. 6, 2023

Related U.S. Application Data

(60) Provisional application No. 63/004,806, filed on Apr. 3, 2020.

(51) Int. Cl.
*A23G 9/28* (2006.01)
*A23G 9/30* (2006.01)
*A23G 9/52* (2006.01)

(52) U.S. Cl.
CPC .............. *A23G 9/281* (2013.01); *A23G 9/30* (2013.01); *A23G 9/52* (2013.01)

(58) Field of Classification Search
CPC . A23G 9/281; A23G 9/30; A23G 9/52; A23G 9/22; A23G 9/28; A23G 9/32; A23G 9/42; A23G 9/44; A23G 9/50
See application file for complete search history.

(56) References Cited

U.S. PATENT DOCUMENTS

| | | | | |
|---|---|---|---|---|
| 5,240,139 | A * | 8/1993 | Chirnomas | G07F 17/0071 221/211 |
| 2002/0119221 | A1* | 8/2002 | Matsukura | A23G 9/287 426/115 |
| 2004/0161503 | A1* | 8/2004 | Malone | A23G 9/327 426/101 |
| 2014/0255562 | A1* | 9/2014 | Chien | A23G 9/287 426/115 |
| 2015/0060486 | A1* | 3/2015 | Gamburg | A23G 9/50 222/107 |
| 2016/0165920 | A1* | 6/2016 | McGill | B29C 45/14336 222/144.5 |

FOREIGN PATENT DOCUMENTS

| | | | |
|---|---|---|---|
| JP | 3188860 U | * | 2/2014 |
| KR | 100299209 B1 | * | 11/2001 |
| KR | 20170083481 A | * | 7/2017 |
| WO | WO 2019077152 A1 | * | 4/2019 |
| WO | 2019222752 A1 | | 11/2019 |

* cited by examiner

*Primary Examiner* — Bob Zadeh
(74) *Attorney, Agent, or Firm* — Jose Cherson Weissbrot

(57) ABSTRACT

The present invention provides innovative ice-cream/yogurt capsule dispensers, and capsules therefor.

21 Claims, 33 Drawing Sheets

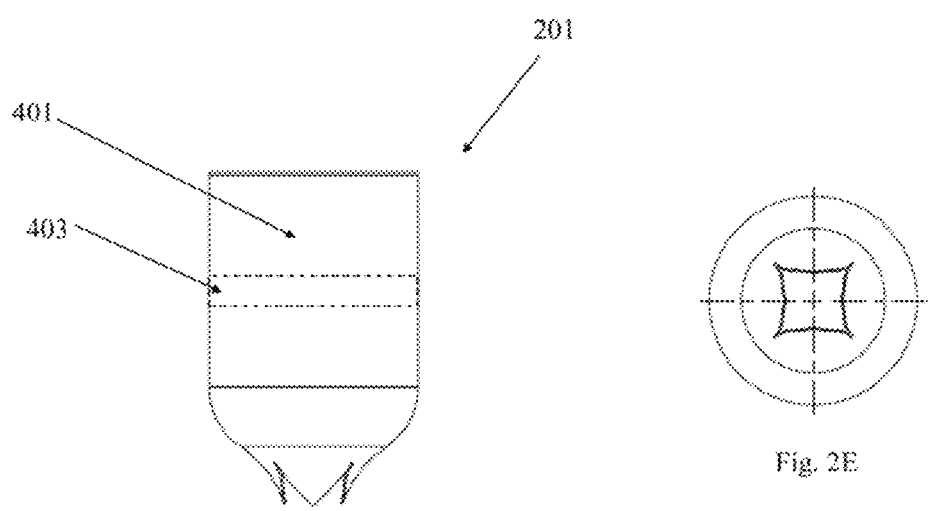
Fig. 2D
Fig. 2E
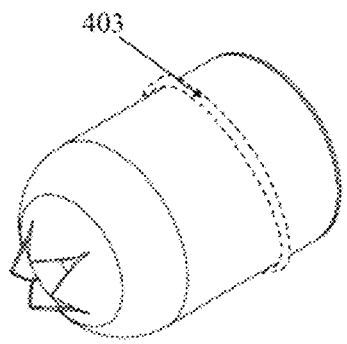
Fig. 2F

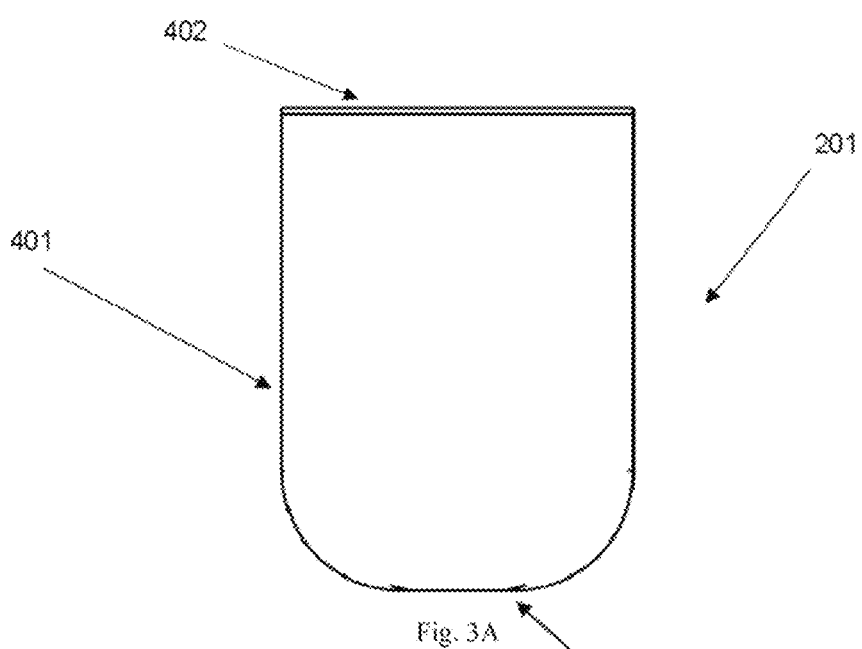
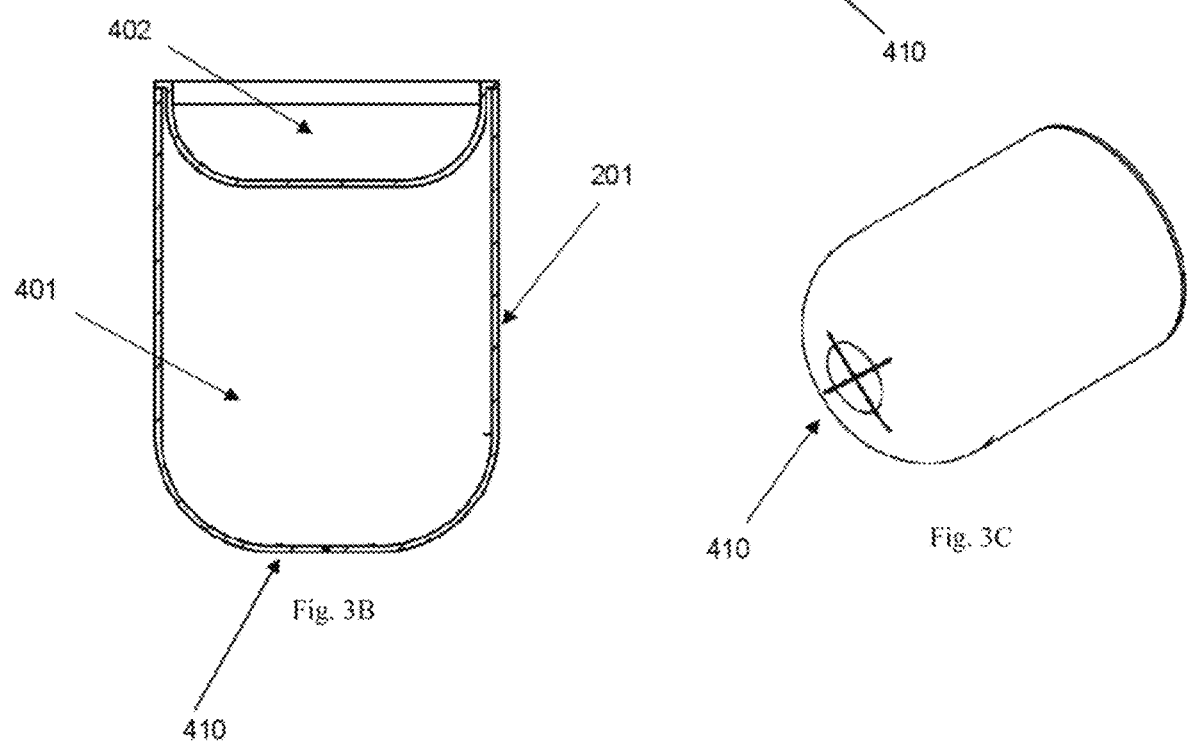

REFRIGERATOR ICE-CREAM DISPENSER AND MATCHING CAPSULES

FIELD OF THE INVENTION

The present invention relates to a refrigerator ice-cream dispenser machine for dispensing ready-to-eat ice-cream and to a dedicated capsule holding ice-cream for use with the machine.

BACKGROUND OF THE INVENTION

Many machines are known for dispensing ice-cream, as seen, e.g., in ice-cream parlors, cafes and kiosks. One well-known machine is designed to dispense whipped ice-cream, so-called "American" or "soft ice-cream".

Some of these machines are designed to produce ice-cream starting from specific bases made up of semi-finished products in the form of soluble powder mixes. Other machines produce ice-cream from "scratch", i.e. by mixing all ingredients (e.g. milk and fruits), until the mix to be cooled is obtained. In both cases, the machines include several trays to contain the preparations or the ingredients of different flavor. The final dispensing operation of the ice-cream occurs via different nozzles for each flavor or combination of flavors.

These known machines are cumbersome, large and expensive, and require demanding operation, including constant activation in order to avoid contamination of the different ingredients. In addition, they provide a limited number of possible flavors to choose from. Moreover, to avoid health risks, these ice-cream machines must be frequently cleaned, which is inconvenient and time-consuming.

The above-mentioned machines are also too expensive and complicated for domestic use. Accordingly, various domestic machines for preparing ice-cream were developed to allow a user to prepare ice-cream at home, i.e., from a mixture of edible ingredients of his liking or from "scratch". In principle, in such a domestic ice-cream machine, the user prepares a mixture of ingredients of choice and the machine cools the mix while mixing.

However, such machines require preliminary preparations (such as cutting fruits), and after use cleaning. In addition, they tend to malfunction, and also forces the user to keep stock of the various required ingredients.

As such, a need exists for a domestic machine that can provide ice-cream on demand, in any desired flavor, which is cost effective and is simple to use and maintain, with no sanitizing required.

SUMMARY OF INVENTION

In a first aspect, the present invention provides a disposable ice-cream/yogurt/fruit or vegetable juices or puree capsule 201 comprising: (a) a main body 401 with an upper section and a lower section; (b) an upper pressable seal/top 402 located at said upper section; (c) an opening located at said lower section or a breakable grooved bottom 410; (d) a predefined amount of ready-to-eat ice-cream/yogurt deposited within said main body 401; (e) a bottom seal/cover 406 placed/attached over said opening and/or said breakable grooved bottom 410, designed to: (i) isolate said ice-cream/yogurt from the surrounding during transportation and storage; (ii) prevent leaking of capsule contents; and (iii) break under pressure to allow said ice-cream/yogurt to exit out of the capsule via said opening and/or breakable grooved bottom 410 upon application of pressure onto the upper seal/top 402; and optionally (f) a nozzle 405 located at the opening at the lower section to shape the ice-cream/yogurt as it exits the capsule.

In a second aspect, the present invention provides a capsule dispenser for dispensing the capsules 201 of the invention, said dispenser comprises: (a) a main body having: two or more compartments 310 designed to hold a plurality of said capsules 201 with ready-to-eat ice-cream/yogurt, and a capsule receiver 205 with an exit opening 206 through which said ready-to-eat ice-cream/yogurt discharges; (b) a capsule transport system designed to deliver a single capsule 201 from its compartment to said capsule receiver 205; and (c) a hydraulic/electric/pneumatic piston or plunger 203 designed to move up and down for pushing said ready-to-eat ice-cream/yogurt from its capsule 201.

In a third aspect, the present invention provides a refrigerator/freezer/vending machine comprising the dispenser of the invention.

In a forth aspect, the present invention provides a method for providing ice-cream/yogurt to a user, the method comprising the steps of: (a) providing a dispenser of the invention; (b) filling the dispenser's compartments 310 with at least one capsule 201 according to the invention; and (c) activating the dispenser by a control panel 102, selecting a desired flavor, and placing a vessel underneath the exit opening 206 for receiving discharged/exiting ice-cream/yogurt, thereby providing ice-cream/yogurt to the user.

BRIEF DESCRIPTION OF DRAWINGS

FIG. 1A is a 3D-view of a capsule; FIGS. 1B-1C are side-views; and FIGS. 1D-1E are bottom-views illustrating possible configuration of the capsule's nozzle.

FIGS. 2A-2F are illustrations of another embodiment of an ice-cream/yogurt capsule according to the invention: FIGS. 2A-2C are illustration of a capsule prior to discharging of its content: FIG. 2A is a side-view; FIG. 2B is a transparent side-view; and FIG. 2C is a 3D-view; and FIGS. 2D-2F are illustration of a capsule after compressing and discharging its content: FIG. 2D is a side-view; FIG. 2E is a bottom-view; and FIG. 2F is a 3D-view.

FIGS. 3A-3F are illustrations of yet another embodiment of an ice-cream/yogurt capsule according to the invention consisting a single unified unit with breakable grooved bottom, and an upper pressable seal/top: FIG. 3I is a side-view; FIGS. 3B & 3J are cross-sectional side-view showing the content of the capsule; and FIG. 3D-3F are illustration of a capsule after compressing and discharging its content showing a ruptured seal/cover. FIG. 3F is a bottom-view illustration of the capsule after compressing and discharging its content showing a ruptured seal/cover. FIG. 3K is a 3-D bottom-view of the capsule after compressing and discharging its content showing a ruptured seal/cover.

FIG. 5A is of a two-doors fridge; FIG. 5B is of a four-doors fridge; FIG. 5C is a front view of the refrigerator of FIG. 5B; FIG. 5D is and illustration of FIG. 5C; FIG. 5E illustrates how the dispenser may be reached by opening a back door for re-filling thereof with capsules, wherein the door further prevents cold/freezing air from exiting the dispenser unit; FIG. 5F is a closeup illustration of FIG. 5E; and FIG. 5G is a front view of a four-doors refrigerator equipped with a dispenser of the invention based on capsule transport system comprises a rail on which the capsule rolls or slides (by gravity).

FIG. 6A is an illustration of the entire refrigerator; and FIG. 6B is closeup of the door with the dispenser.

FIG. 7A illustrates the position of the capsule before the pressing process, where a cone is placed underneath the exit opening; FIG. 7B illustrates the cone filled with ice-cream; and FIG. 7C illustrates the manually release/dispensing of the empty capsule.

DETAILED DESCRIPTION

Figure 1A:
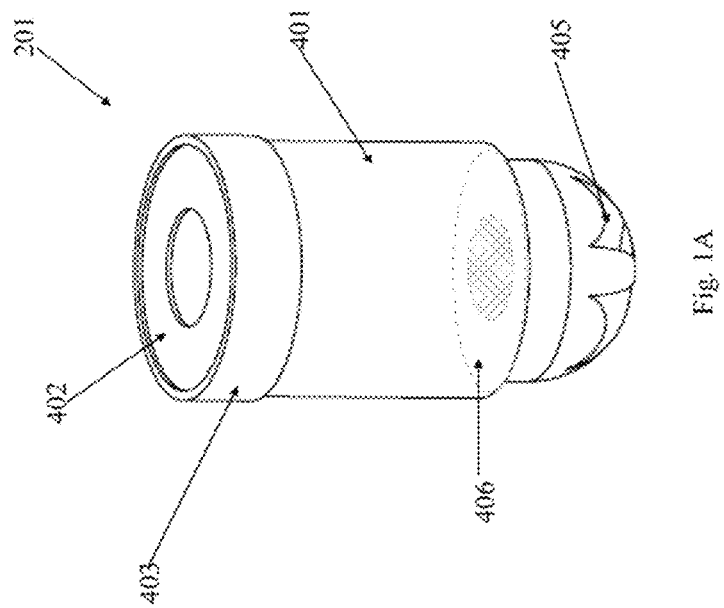
FIGS. 1A-1E are illustrations of an ice-cream/yogurt capsule according to some embodiments of the invention.
Figure 1B:
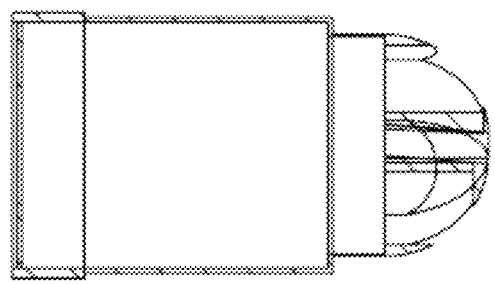
Figure 1D:
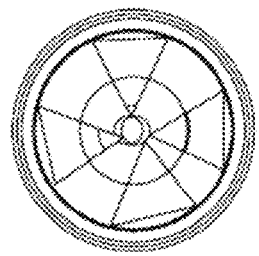
Figure 1C:
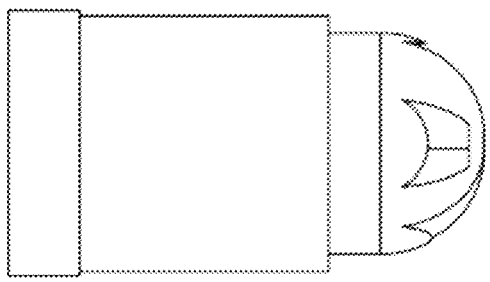
Figure 1E:
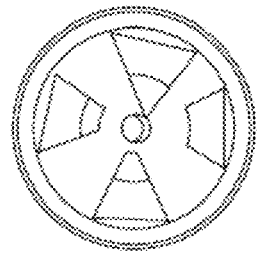

Today, ice-cream vending machines are cumbersome, expensive and require a lot of maintenance. As such, they are usually found only in businesses. Moreover, they are usually limited to one or two flavors. In contrary, the present invention provides simple devices and systems that are installed in the doors of refrigerators and freezers, which are found in every home, for dispensing on-demand ice-cream or yogurt in any desired flavor, and for preparing shakes and smoothies. The devices and systems of the invention can be used at home, as well as public places, such as vending machines, kiosks and other businesses.

Accordingly, the present invention provides a disposable capsule 201 (illustrated in FIGS. 1-3) comprising: (a) a main body 401 with a sealed upper section and a lower section with a breakable grooved bottom opening 410, or covered with a breakable cover 406, wherein the sealed upper section is optionally constructed by a seal/top 402 located at the upper section; and (b) a predefined amount of ready-to-eat ice-cream/yogurt deposited within the main body 401; wherein the breakable grooved bottom 410 or the cover 406 are designed to: (i) isolate the ice-cream/yogurt from the surrounding during transportation and storage; and (ii) prevent leaking of capsule contents; and (iii) open automatically to allow the ice-cream/yogurt to exit once pressure is applied onto the body 401 and/or onto the sealed upper section.

In specific embodiments, and as illustrated in FIG. 1, the present invention provides a disposable capsule 201, comprising: (a) a main body 401 with an upper section and a lower section; (b) an upper seal/top 402 located at the upper section; (c) an opening located at the lower section; (d) a protrusion 403 around the main body 401 to provide a means that enables gripping the capsule; (e) a predefined amount of ready-to-eat ice-cream/yogurt deposited within the main body 401; (f) a cover 406 placed/attached over the opening and designed to: (i) isolate the ice-cream/yogurt from the surrounding during transportation and storage; (ii) prevent leaking of capsule contents; and (iii) break under pressure to allow the ice-cream/yogurt to exit out of the capsule; and optionally (g) a nozzle 405 located at the opening at the lower section to shape the ice-cream/yogurt as it exits the capsule.

Figure 2A:
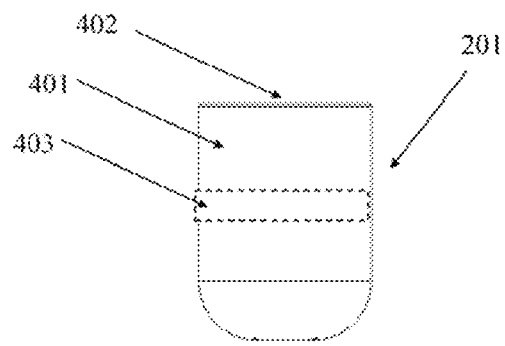
Figure 2B:
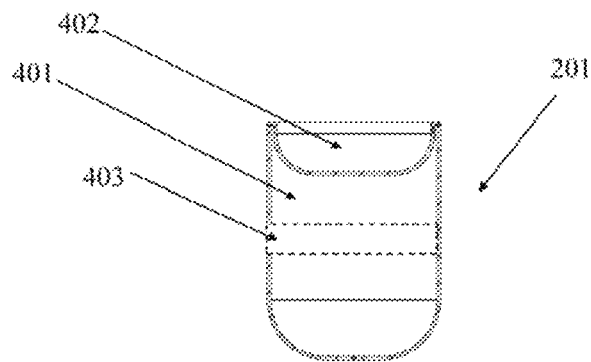

In alternative specific embodiments, and as illustrated in FIG. 2, the present invention provides a disposable capsule 201, comprising: (a) a main body 401 consisting of one or more parts; (b) an upper pressable seal/top/cover 402 at the capsule's top; (c) a predefined amount of ready-to-eat ice-cream/yogurt deposited within the main body 401; (d) a breakable grooved bottom 410 at the capsule's bottom designed to: (i) isolate the ice-cream/yogurt from the surrounding during transportation and storage; (ii) prevent leaking of capsule contents; and (iii) break under pressure to allow the ice-cream/yogurt to exit out of the capsule; and optionally (f) a nozzle located at the opening at the lower section to shape the ice-cream/yogurt as it exits the capsule. In such a configuration, the capsule's bottom section may be made of the same or different material as the capsule's upper section, and/or of a weaker material or thinner layered-material to enable breaking-open once pressure is applied. Also illustrated is an optional protrusion 403 located (dashed circle around the main body).

In further alternative specific embodiments, and as illustrated in FIG. 3, the present invention provides a disposable capsule 201, comprising: (a) a main body 401; (b) an upper pressable seal/top/cover 402 at the capsule's top; (c) a predefined amount of ready-to-eat ice-cream/yogurt deposited within the main body 401; and (d) a breakable grooved bottom 410 at the capsule's bottom, designed to: (i) isolate the ice-cream/yogurt from the surrounding during transportation and storage; (ii) prevent leaking of capsule contents; and (iii) break under pressure to allow the ice-cream/yogurt to exit out of the capsule, wherein the resultant broken grooved bottom further operates as a nozzle to shape the ice-cream/yogurt as it exits the capsule.

Figure 4:
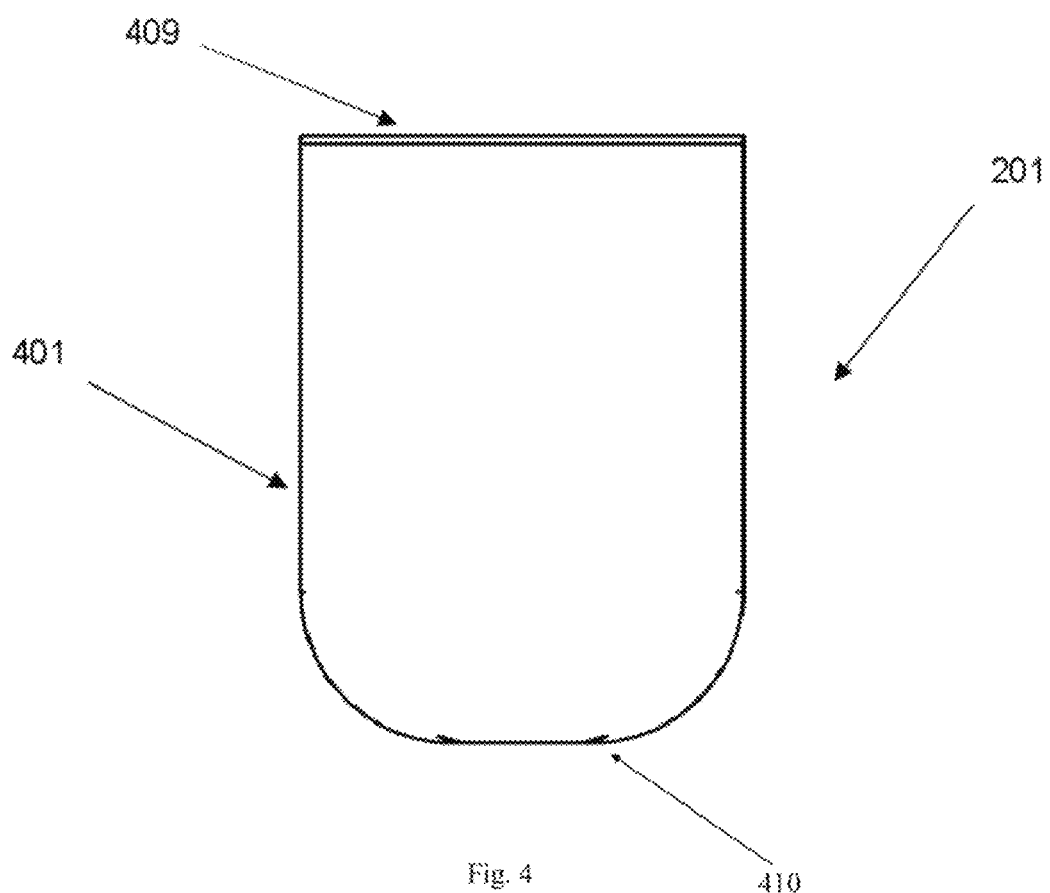
FIG. 4 is a side-view illustration of yet another embodiment of an ice-cream/yogurt capsule according to the invention, which is made of a single unified unit without moving parts, designed to pressed/squeezed.

In yet further alternative specific embodiments, the present invention provides a disposable capsule 201 (illustrated in FIG. 4) comprising: (a) a pressable main body 401 with an upper section and a lower section; (b) an upper pressable sealed top/cover 409 located at the upper section; (c) a predefined amount of ready-to-eat ice-cream/yogurt deposited within the main body 401; and (d) a breakable grooved bottom 410 at the lower section designed to: (i) isolate the ice-cream/yogurt from the surrounding during transportation and storage; (ii) prevent leaking of capsule contents; and (iii) break under pressure to allow the ice-cream/yogurt to exit out of the capsule, wherein breaking thereof creates a nozzle-shaped exit designed to shape the ice-cream/yogurt as it exits the capsule.

The shape, size and color of the capsule 201 can vary and can be determined according to need and desire, such as according to the dispenser being used. For instance, when using a dispenser with an electric transportation system that requires capturing a capsule 201 by a capsule holder 202 and then moving/delivering it to a capsule receiver 205, it is advisable to use a capsule with a protrusion 403 (or grove) around the main body 401 to enable gripping the capsule during transportation. Alternatively, when using a dispenser that utilizes gravitation to deliver a capsule 201 to a capsule receiver 205, e.g., letting the capsule roll along a rail 210, it might be advisable to use a capsule with a straight shaped cylindered body 401 that can smoothly roll/slide on such a rail 210. Notably, the rail 210 can be configured to accompany and allow rolling of specifically shaped capsules, e.g., even with such a protrusion 403 around the main body 401 as illustrated in FIG. 1. Nevertheless, it is noted that any capsule according to the invention can fit any dispenser of the invention, with the proper adjustments as needed.

As noted, the capsule 201 may include a nozzle 405. Alternatively, a pseudo-nozzle can be created by the rupture of the opening at the lower section of the capsule.

In certain embodiments, the present invention provides a disposable capsule 201 comprising: (a) a main body 401, such as a round/tube or any other shape body, with an upper section and a lower section; (b) an upper pressable seal/top 402 located at the upper section; (c) an opening located at the lower section; (d) a predefined amount of ready-to-eat ice-cream/yogurt deposited within the main body 401; and (e) a bottom, optionally breakable grooved bottom 410 for easy opening, or a seal/cover 406 placed/attached over the opening and designed to: (i) isolate the ice-cream/yogurt from the surrounding during transportation and storage; (ii) prevent leaking of capsule contents; and (iii) break under pressure to allow the ice-cream/yogurt to exit out of the capsule.

The term "capsule" as used herein refers to any container that holds desired food stuff. A capsule may also be referred to as pod, container, vessel, can, etc. The capsule of the invention (and its components, such as the cover, the seal, etc.) can be made of any suitable material.

The terms "ice-cream" and "yogurt" as used herein refer to any semi-liquid frozen food stuff, such as different types, textures and flavors of ice-cream, sorbet, soft ice-cream, gelato frozen yogurt, milkshake, smoothie, frozen fruits/vegetable/superfood juices or puree, frozen healthy mixture with various supplements, frozen cocktails, etc.

The capsule 201 of the invention is designed to be placed and used by a dedicated dispenser. As such, it comprises means that enable transporting, carrying or rolling, and holding thereof by such a dispenser for discharging the ice-cream therewithin. Accordingly, in certain embodiments, the capsule 201 of the invention further comprises a protrusion 403 around the main body 401 to provide such a means that enables gripping of the capsule, and to stop the capsule from falling out through the exit opening 206, e.g. by dedicated protrusions, arms, conveyor, box/chamber, etc. within the dispenser.

In alternative or added embodiments, the main body 401 has a conic/pyramid-like shape in which the upper section is wider that the lower section to enable gripping of the capsule, such that the wider upper section constitutes such means for transporting, carrying and holding the capsule 201.

In certain embodiments, the capsule 201 of the invention (of any type) further comprises a protrusion 403 around the main body 401 (at any location thereon on the main body—at the top, middle or bottom) to provide such a means that enables gripping of the capsule 201, and to stop the capsule from falling out through the exit opening 206, e.g. by dedicated protrusions, arms, conveyor, box/chamber, etc. within the dispenser.

The ice-cream or yogurt within the capsule 201 is designed to be pushed/squeezed/discharged outside the capsule. Accordingly, in certain embodiments of the capsule 201 according to the invention, the upper seal/top 402 is designed to be pushed into the main body 401 for pushing the ice-cream/yogurt through the capsule's opening located at its lower section and optionally via a nozzle 405. In alternative embodiments, the main body 401 is collapsible such that the ice-cream/yogurt is pushed outside the capsule by pressing and collapsing the capsule's main body 401. In further alternative embodiments, the main body 401 is rigid and pressing the upper top/seal 402 pushes the ice-cream/yogurt through the opening of the capsule. All these configurations are aimed to prevent contact between the dispenser's components and the ice-cream/yogurt, thereby eliminating the need for cleaning such components and possible contamination of the ice-cream/yogurt and keep the process sterile and clean.

In certain embodiments of the capsule 201 of any of the embodiments above, the seal/cover 406 attached/placed over the opening thereof is breakable, thereby allowing passage of ice-cream/yogurt via the opening once pressure is applied onto the upper seal/top 402—the pressure pushes the ice-cream/yogurt against the seal/cover 406 that breaks open to allow passage of the ice-cream/yogurt. The breakability of the seal/cover 406 can be obtained in any known technique, such as by generating breaking-grooves thereacross, by generating small perforations thereacross, and by making it or comprise therewith thin-rupturable material, or any combination thereof. FIGS. 1A, 1D, 1E, 2C and 3C illustrate a seal/cover 406 with predefined breaking-grooves or perforations.

Figure 2C:
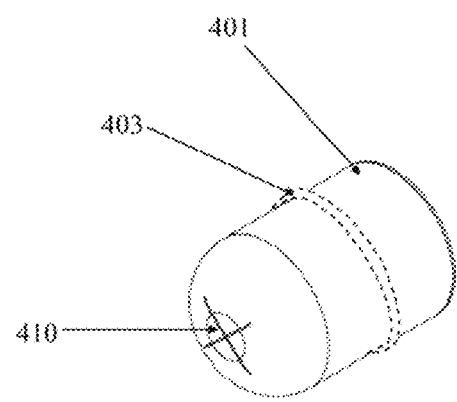
Figure 3D:
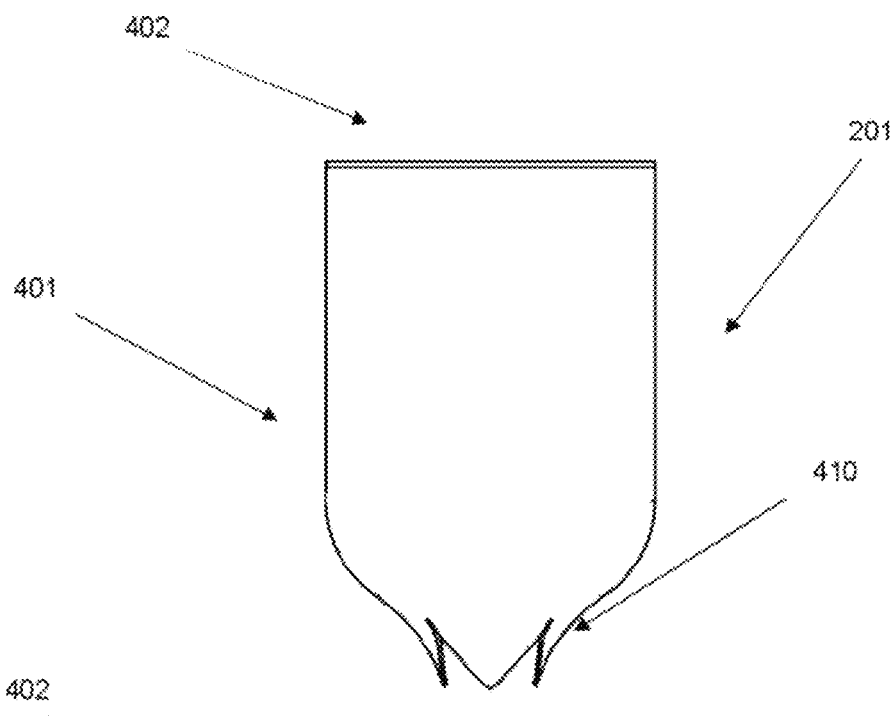
Figure 3E:
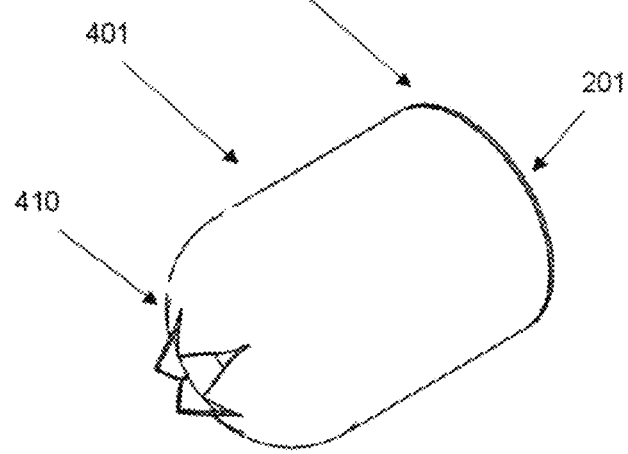
Figure 3F:
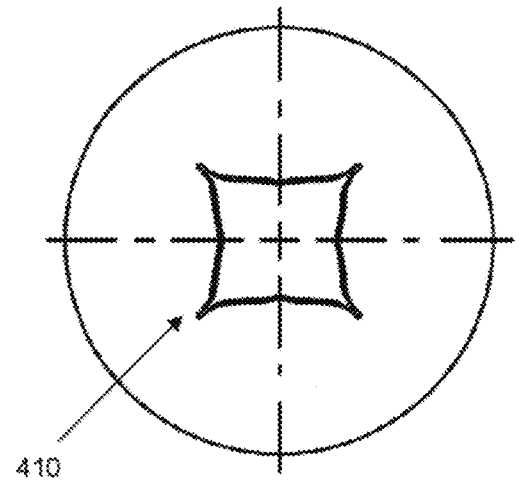
Figure 3G:
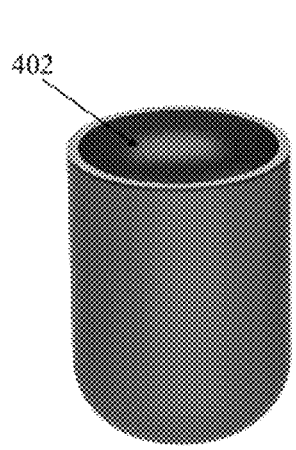
FIGS. 3G-3K are 3D-views of an ice cream/yogurt capsule.
Figure 3H:
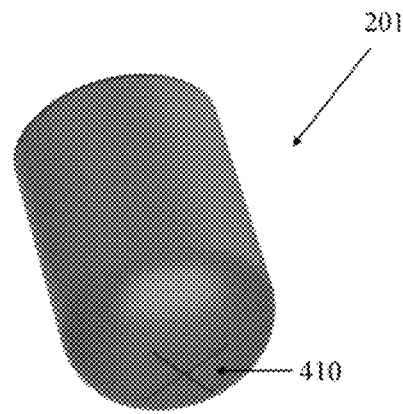
Figure 3I:
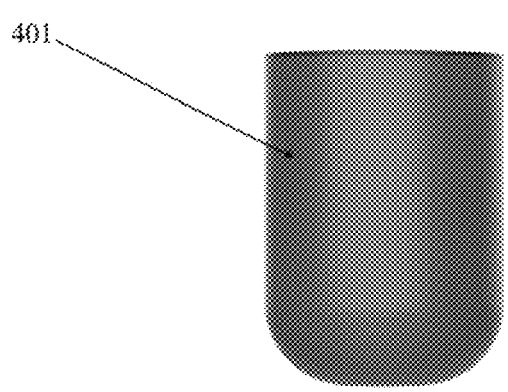
Figure 3J:
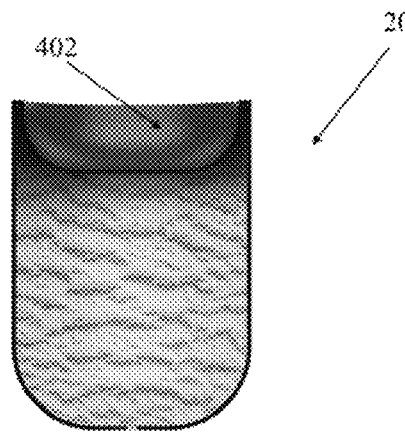
Figure 3K:
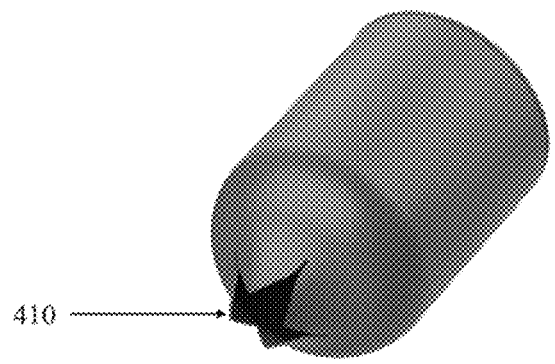

In certain embodiments of the capsule 201 of any of the embodiments above, the bottom in the lower section is breakable, thereby allowing passage of ice-cream/yogurt via the opening once pressure is applied onto the upper seal/top 402: the pressure pushes the ice-cream/yogurt within the capsule against the bottom section, which eventually breaks open to allow passage of the ice-cream/yogurt. The breakability of the bottom section can be obtained in any known technique, such as by generating breaking-grooves in the bottom body 410, by generating small perforations thereacross, and by making it or comprise therewith thin-rupturable material, or any combination thereof. FIGS. 2C and 3C illustrate such lower body with breaking-grooves thereacross, by generating small perforations which breaks once pressure is applied and open to allow passage of the ice-cream/yogurt.

In certain embodiments, in order to avoid contact of the contents of the capsule with the device itself and its parts and to obtain a nice-looking shape of the discharged/squeezed ice-cream, the capsule 201 further comprises a nozzle 405 located at the capsule's opening at its lower section. Such a nozzle 405 is designed to shape the ice-cream/yogurt as it exits the capsule in a nice-looking shape, e.g. wavy or star-shaped, that is determined according to the type and shape of the nozzle 405. In certain embodiments, the nozzle 405 is located over the seal/cover 406, such that breakage of the seal/cover 406 occurs "internally".

In specific embodiments, the breakable grooved bottom 410 constitutes, after its rupture (i.e. once it breaks after pressure is applied), as a nozzle. In specific embodiments, the rupture of the breakable grooved bottom 410 generates a nozzle-shaped opening that is responsible for the final shape of the exiting ice-cream/yogurt. In other embodiments, the nozzle and the bottom seal/cover constitute the same unit (illustrated in FIGS. 1-4).

In specific embodiments, the nozzle 405 is affixed in place and is positioned such that it sticks out of the boundaries of the capsule's main body. In such a configuration, the upper seal/top 402 is constructed in a complementary way to accommodate the shape of the nozzle of a second capsule placed on top of it, e.g. during storage or when stacked in a dispenser. In specific embodiments, the nozzle 405 is not affixed in place, but resides within the main body 401 during storage, and when the ice-cream is pushed out of the capsule, the nozzle 405 is pushed/pops out. The position of the nozzle 405 assists in pouring the ice-cream/yogurt into a vessel, e.g. by extending the exit opening which reduces the risk of the exiting ice-cream touching the dispenser. Accordingly, in certain embodiments of the capsule 201 of any of the embodiments above, the nozzle 405 is designed to extend outside an ice-cream/yogurt discharge opening within a dispenser.

The size and shape of the capsule 201 of the invention, e.g. its main body 401, its nozzle 405, the upper pressable seal/top 402, the breakable grooved bottom 410, etc., can vary according to need and desire, such as the desired portion size of the ice-cream/yogurt. The capsule 201 and/or its main body 401 can be of uniform thickness and/or of variable and non-uniform thickness as needed. For example, the body thickness at the lower end of the capsule can be thinner, with or without grooves, to allow the capsule to break open when pressure is applied to the upper pressable seal/top 402 and pressing the contents of the capsule out of the capsule. In addition, the shape of the capsule 201 and/or main body 401 can be cylindered or conic, can be squared, pentagrammic or hexagonal (see illustration of various capsules configurations in FIGS. 1-4). Notably, when the capsule's shape is such that prevent it from rolling, e.g. square, conic pyramid, etc., a designated delivery mechanism needs to be used to deliver/transport the capsule 201 to the capsule receiver 205 in the dispenser. However, if the capsule's shape enables free rolling thereof, the dispenser can be constructed without such a delivery mechanism, by using gravity as a means to roll the capsule 201 along a rail 210 from its storage compartment to the capsule receiver 205. In specific embodiments, the capsule 201 and main body 401 and the upper pressable seal/top 402 and the nozzle 405 is cylindered. In specific embodiments of the capsule 201 of the invention, the main body 401 (and the upper pressable seal/top 402) has a tubular shape enabling pressing the upper seal/top. The size of the capsule 201 and main body 401 can also vary so that different sized capsules comprise different amounts of ice-cream/yogurt. Alternatively, capsules of the same external size comprise different amounts of ice-cream/yogurt, e.g. by using thinner walls or different height of the upper seal/top 402. In certain embodiments, each capsule 201 and/or nozzle 405 has a specific color or shape according to its content, e.g, flavor, type, amount, etc.

In certain embodiments, the capsule 201 is shaped such that several capsules can be stacked on one another without falling and in order to save space. This can be done, e.g. by shaping the upper seal 402 to fit into the nozzle 405, or vise-versa. Accordingly, in certain embodiments of the capsule 201 according to the invention, the upper seal/top 402 is curved, e.g., into the main body 401, and the opening and nozzle 405 are curved, e.g. away from the main body, in a manner fitting to the curved seal/top, such that one capsule 201 can be stacked onto another, e.g. during storage, transportation or when stacked in a dedicated ice-cream dispenser.

In certain embodiments of the capsule 201 of any of the embodiments above, the upper seal/top 402 is shaped to fit the shape of the nozzle 405 such that one capsule 201 can be stacked onto another, e.g. during transport and storage or when placed in the compartments ion the container. In specific embodiments, the seal/top 402 has an inwardly sunken space/gap into which an outwardly-curved nozzle 405 of a second capsule can fit.

In certain embodiments of the capsule 201 of any of the embodiments above, the upper seal/top 402 is shaped to fit the shape of the breakable grooved bottom 410 such that one capsule 201 can be stacked onto another, e.g. during transport and storage or when placed in the compartments ion the container.

In certain embodiments, the upper seal/top 402 and the cover 406 or the breakable grooved bottom 410 are designed to prevent undesired spillage of the ice-cream/yogurt from the capsule 201, as well as to prevent absorption of odors by the ice-cream/yogurt within the capsule during storage.

In specific embodiments, the present invention provides a disposable ice-cream/yogurt capsule 201 comprising: (a) a main body 401 with an upper section and a lower section; (b) an upper pressable seal/top 402 located at said upper section characterized in that it can be pushed into said main body 401 for pushing said ice-cream/yogurt through said opening; (c) an opening located at said lower section; (d) a predefined amount of ready-to-eat ice-cream/yogurt deposited within said main body 401; (e) a bottom seal/cover 406 placed/attached over said opening and designed to: (i) isolate said ice-cream/yogurt from the surrounding during transportation and storage; (ii) prevent leaking of capsule contents; and (iii) break under pressure to allow said ice-cream/yogurt to exit out of the capsule via said opening upon application of pressure onto the upper seal/top 402; (f) a protrusion 403 around said main body 401 to enable gripping of the capsule; and (g) a nozzle 405 located at said opening and designed to shape the ice-cream/yogurt as it exits the capsule.

In specific embodiments, the present invention provides a disposable ice-cream/yogurt capsule 201 comprising: (a) a main body 401 with an upper section and a lower section; (b) an upper pressable seal/top 402 located at said upper section characterized in that it can be pushed into said main body 401 for pushing said ice-cream/yogurt through said opening; (c) a breakable grooved bottom 410 located at said lower section characterized in that it can be break and allow pushing said ice-cream/yogurt, and designed to: (i) isolate said ice-cream/yogurt from the surrounding during transportation and storage; (ii) prevent leaking of capsule contents; and (iii) break under pressure to allow said ice-cream/yogurt to exit out of the capsule via said opening upon application of pressure onto the upper seal/top 402; and (d) a predefined amount of ready-to-eat ice-cream/yogurt deposited within said main body 401.

In specific embodiments thereof, the upper seal/top 402 is shaped to fit the nozzle 405 to enable stacking one capsule 201 onto another. In yet further specific embodiments, the upper seal/top 402 has a sunken space/gap fitting an outwardly-curved nozzle 405.

In specific embodiments thereof, the upper seal/top 402 is shaped to fit the breakable grooved bottom 410 to enable stacking one capsule 201 onto another. As noted above, the capsule 201 of the invention is designed to be used by a dedicated dispenser. Accordingly, the present invention provides such a capsule dispenser.

In certain embodiments, the capsule dispenser is designed to be installed in a separated and independent freezer unit designed to maintain a predefined serving temperature of a ready-to-eat ice-cream/yogurt. Such freezer unit can be a stand-alone unit or be integrated/installed within a door of an existing fridge, such as in a door of a freezer chamber or of a refrigerator chamber. In alternative embodiments, the capsule dispenser is designed to be placed/integrated directly within a freezer chamber, e.g. of a refrigerator, such that the freezer chamber provides the required predefined serving temperature to preserve the ice-cream/yogurt (i.e. without using a separated and independent freezer unit).

Figure 5A:
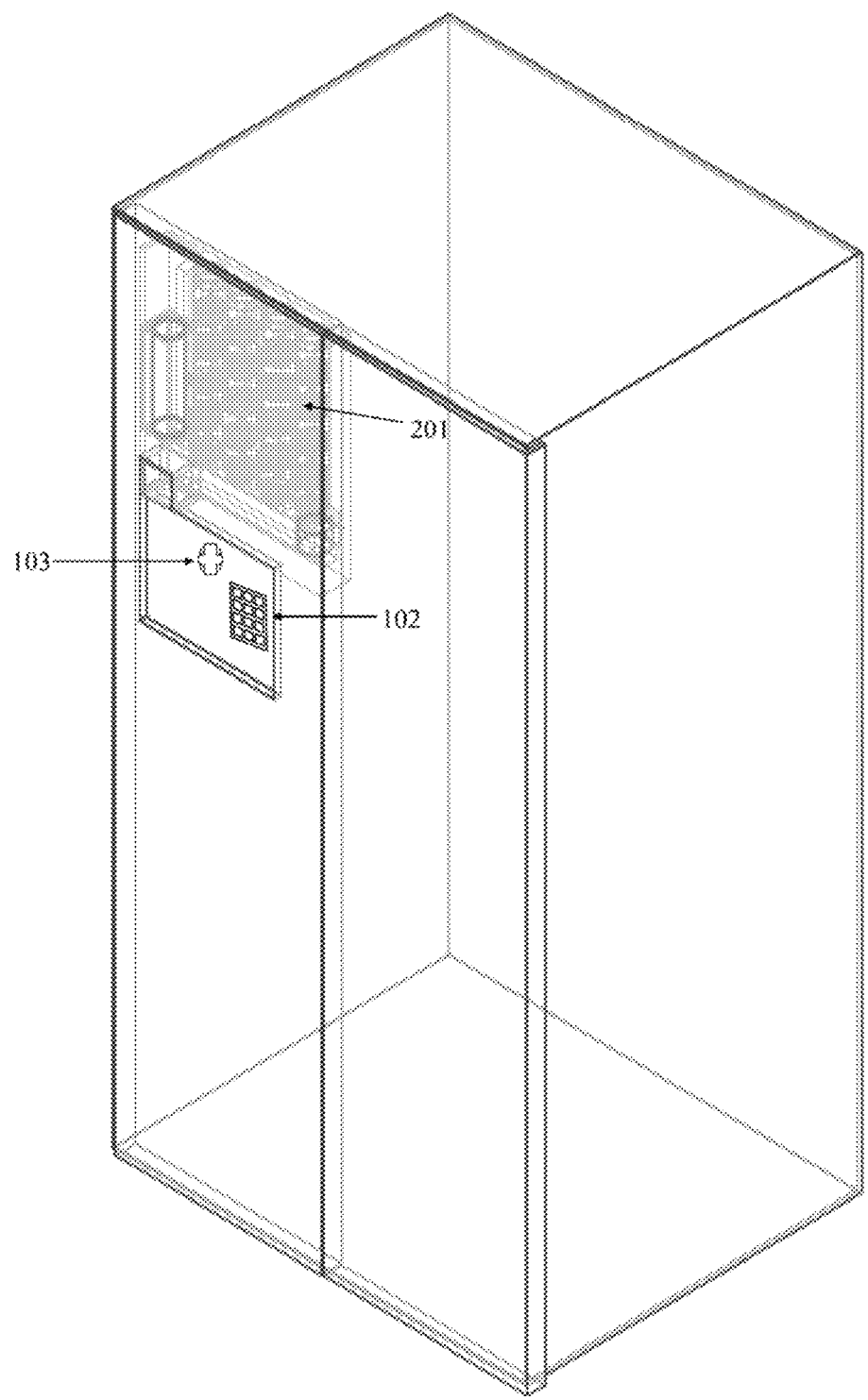
FIGS. 5A-5G are illustrations of a refrigerator comprising an ice-cream/yogurt capsule dispenser and a control panel, according to some embodiments of the invention.
Figure 5B:
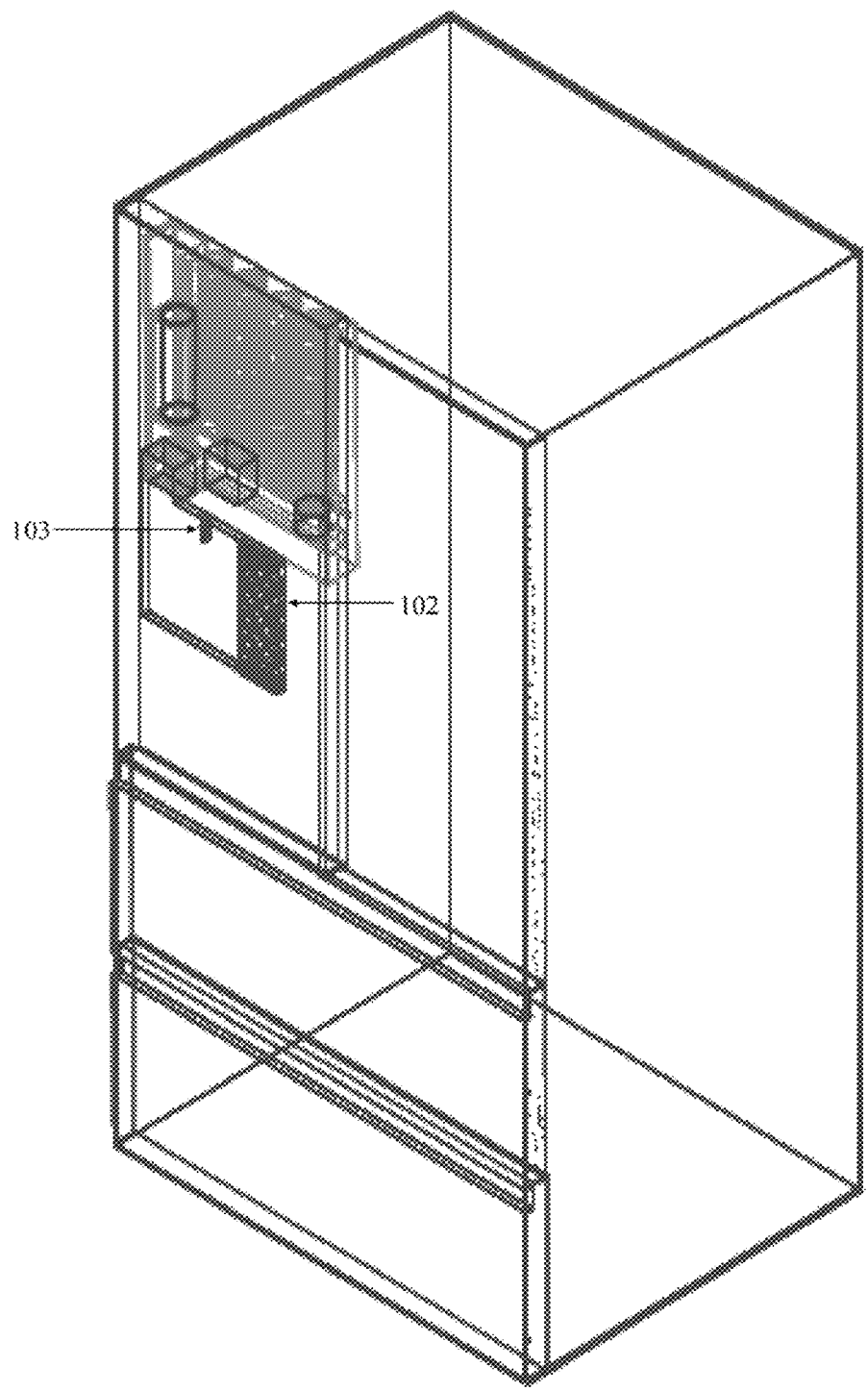
Figure 5C:
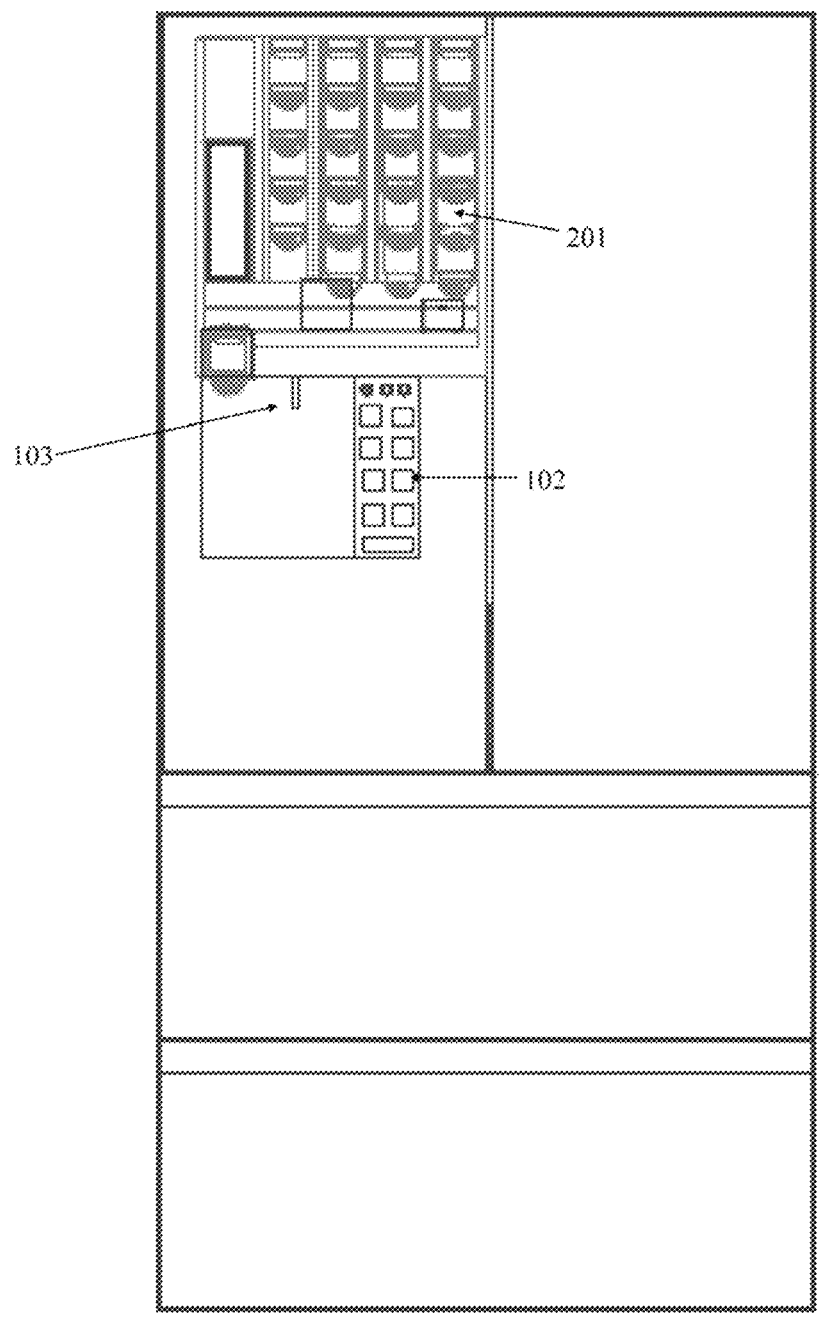
Figure 5D:
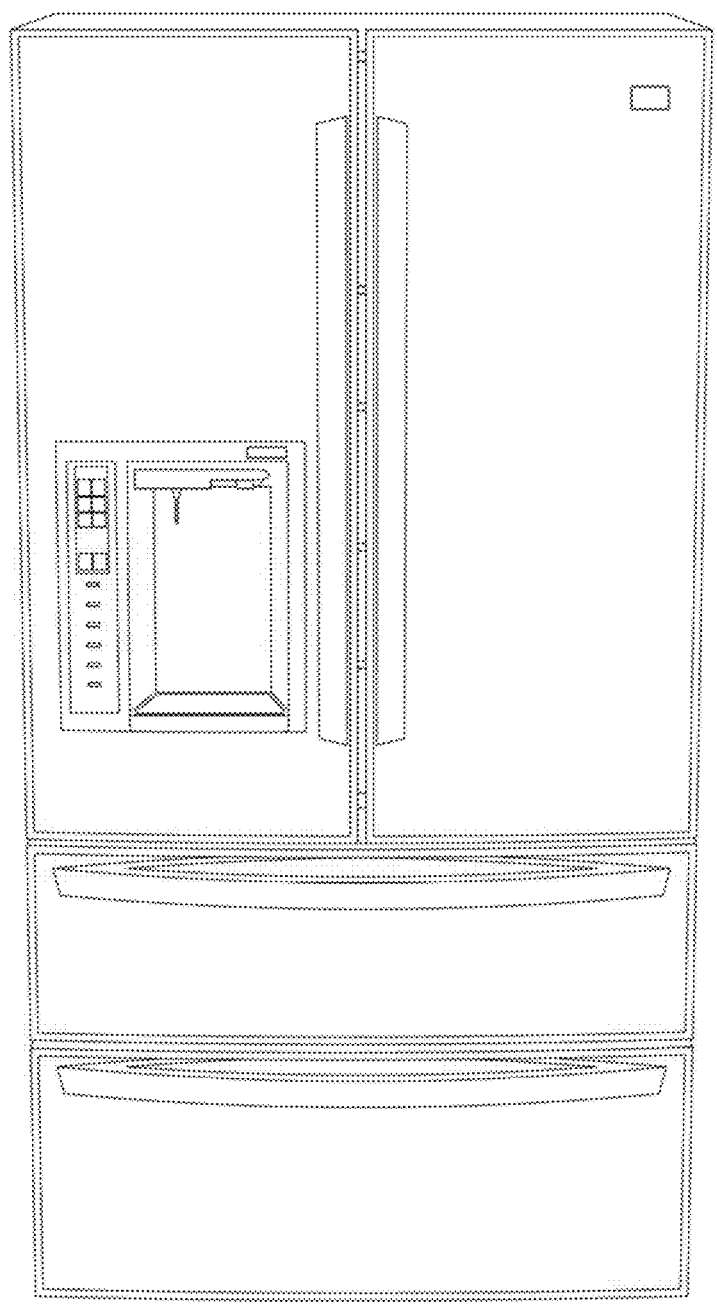
Figure 5E:
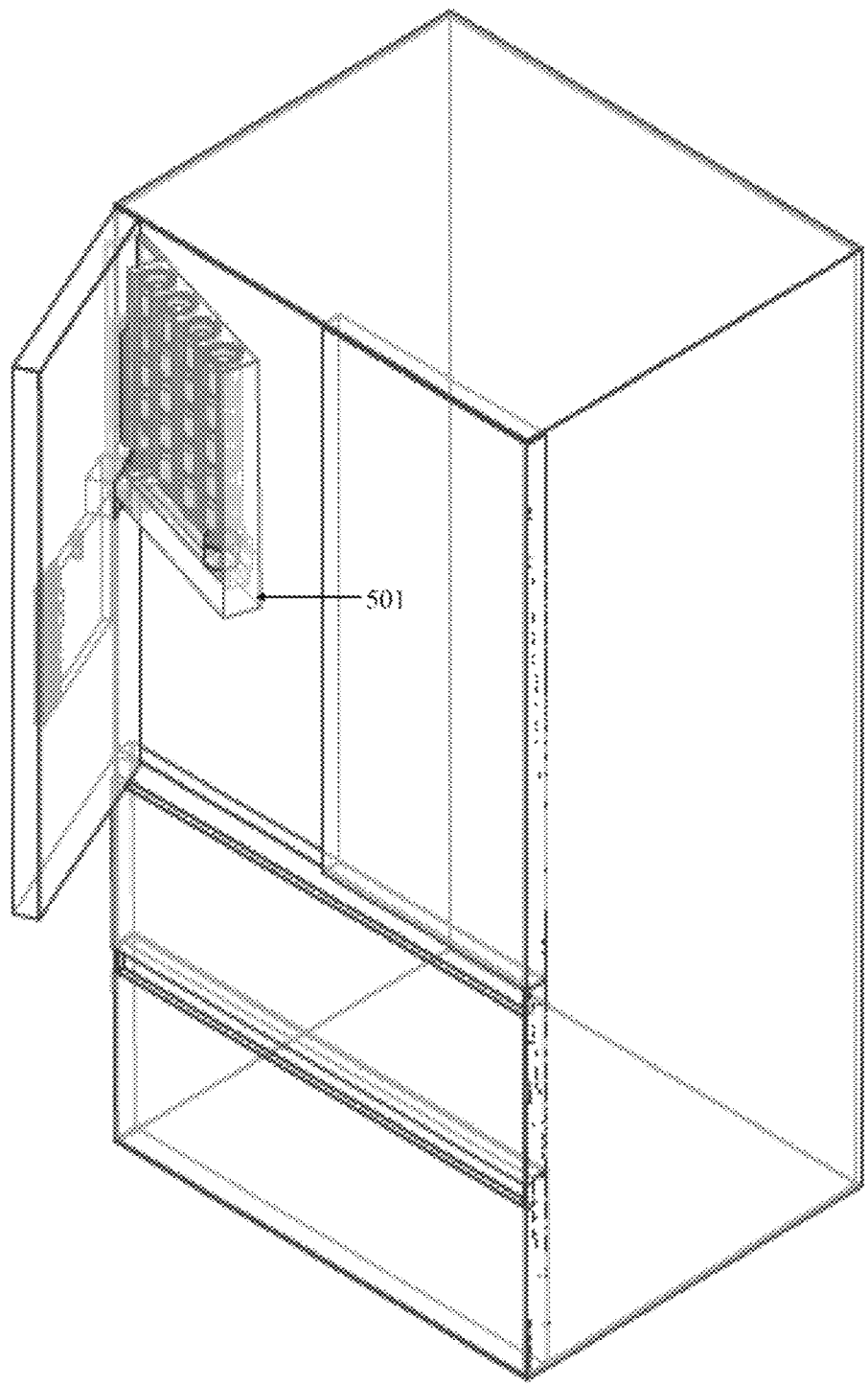
Figure 5F:
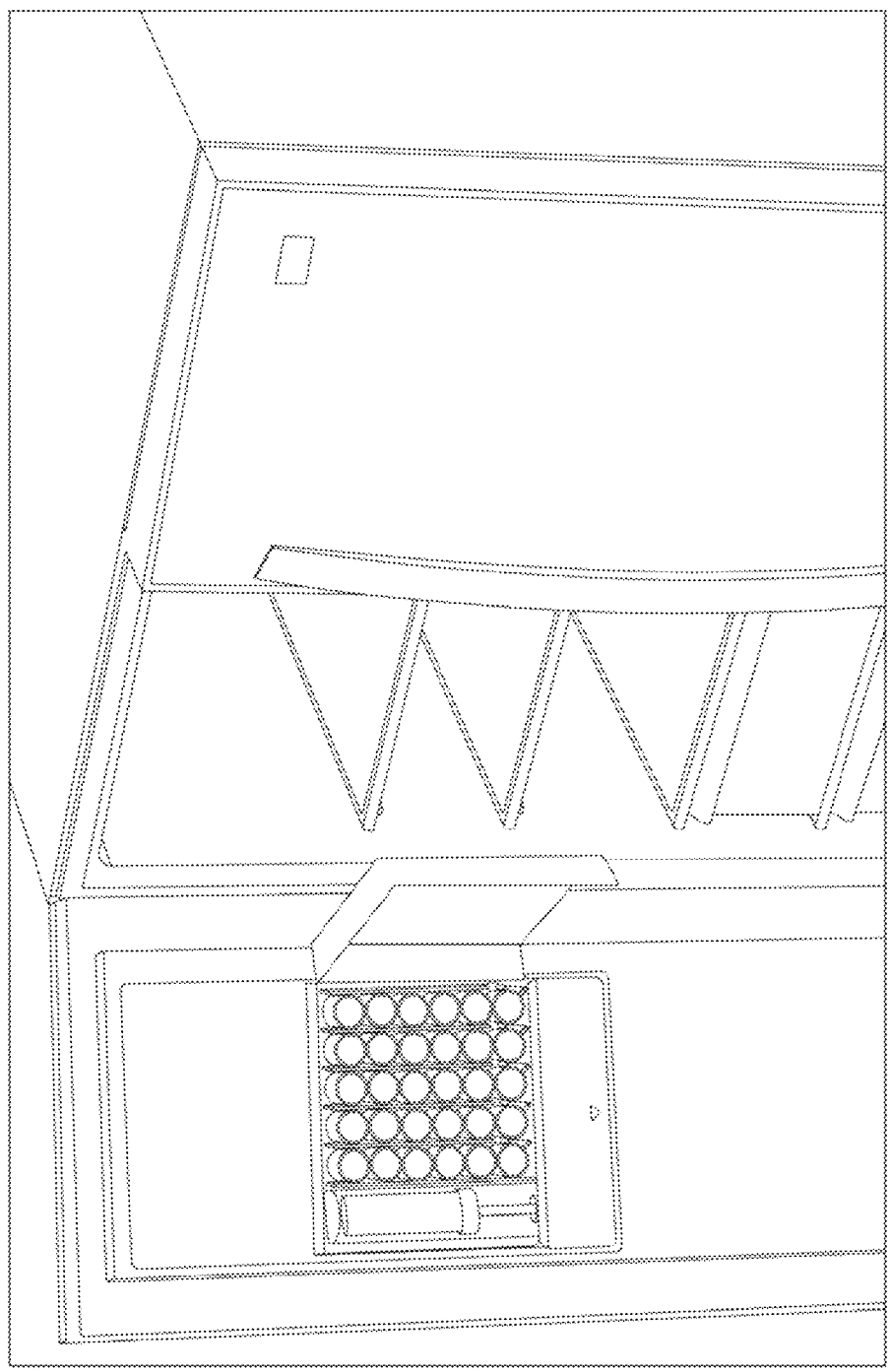

In certain embodiments, the present invention provides a capsule dispenser designed to be placed/integrated/installed in a separated and independent freezer unit/device designed to maintain a predefined serving temperature of a ready-to-eat ice-cream/yogurt, the freezer unit/device is located and installed in a door of a freezer chamber or of a refrigerator chamber, the dispenser comprises: (a) a main body having: two or more compartments 310 designed to hold a plurality of disposable capsules 201 with ready-to-eat ice-cream/yogurt, and a capsule receiver 205 that includes permanent or mobile U-shaped, or any other shape, bracket 320 with an exit opening 206 through which the ready-to-eat ice-cream/yogurt discharges; (b) an electric capsule transport system or rail 210 designed to grab/hold/roll and deliver a single capsule 201 from its compartment to the capsule receiver 205, the system comprises a capsule holder 202 and an engine; and (c) a hydraulic/electric/pneumatic piston or plunger 203 designed to move up and down for pushing the capsule 201 and/or the upper pressable seal/top 402 to serve the ready-to-eat ice-cream/yogurt from its capsule 201, wherein the independent freezer unit/device comprises a door 501 to enable refilling new capsules 201 into the dispenser and to prevent cold/freezing air from exiting the freezer device FIG. 5A illustrates a side-by-side two-doors refrigerator equipped with a capsule dispenser according to some embodiments of the invention—the door may be either the door of the freezer chamber or the refrigerator chamber, in which case the capsule dispenser is within its independent freezer unit. FIGS. 5B-5G illustrates a 4-door refrigerator with 2 freezer-drawers, wherein a capsule dispenser according to the invention is integrated with the left door, which is not of the freezer chamber, in which case the capsule dispenser is within its independent freezer unit. In both examples, there is an external opening in the door into which the capsule dispenser is integrated while keeping it thermally isolated from the inner chamber, thereby enabling a user to receive an ice-cream or yogurt serving without opening the refrigerator's door. FIGS. 5E & 5F illustrate how a user may open the back door of the dispenser (or an isolating door of a freezer chamber containing the dispenser) for re-filling the dispenser with new capsules 201. This door prevents cold/freezing air from exiting the dispenser unit and keeps the dispenser thermally isolated from the freezer or refrigerator chamber. As illustrated, the capsule dispenser is integrated in the refrigerator's door a similar manner to known ice-cube generators.

In certain embodiments, the capsule dispenser of the invention comprises: (a) a main body having two or more compartments 310 designed to hold a plurality of disposable capsules 201 with ready-to-eat ice-cream/yogurt, and a capsule receiver 205 with permanent or mobile U-shaped, or any other shape, bracket 320 with an exit opening 206 through which the ready-to-eat ice-cream/yogurt discharges; (b) a capsule transport system designed to deliver a single capsule 201 from its compartment to the capsule receiver 205; and (c) a hydraulic/electric/pneumatic piston/plunger 203 for pushing the capsule 201 and/or the upper pressable seal/top 402 to serve the ready-to-eat ice-cream/yogurt from the capsule 201 through the exit opening 206.

Figure 5G:
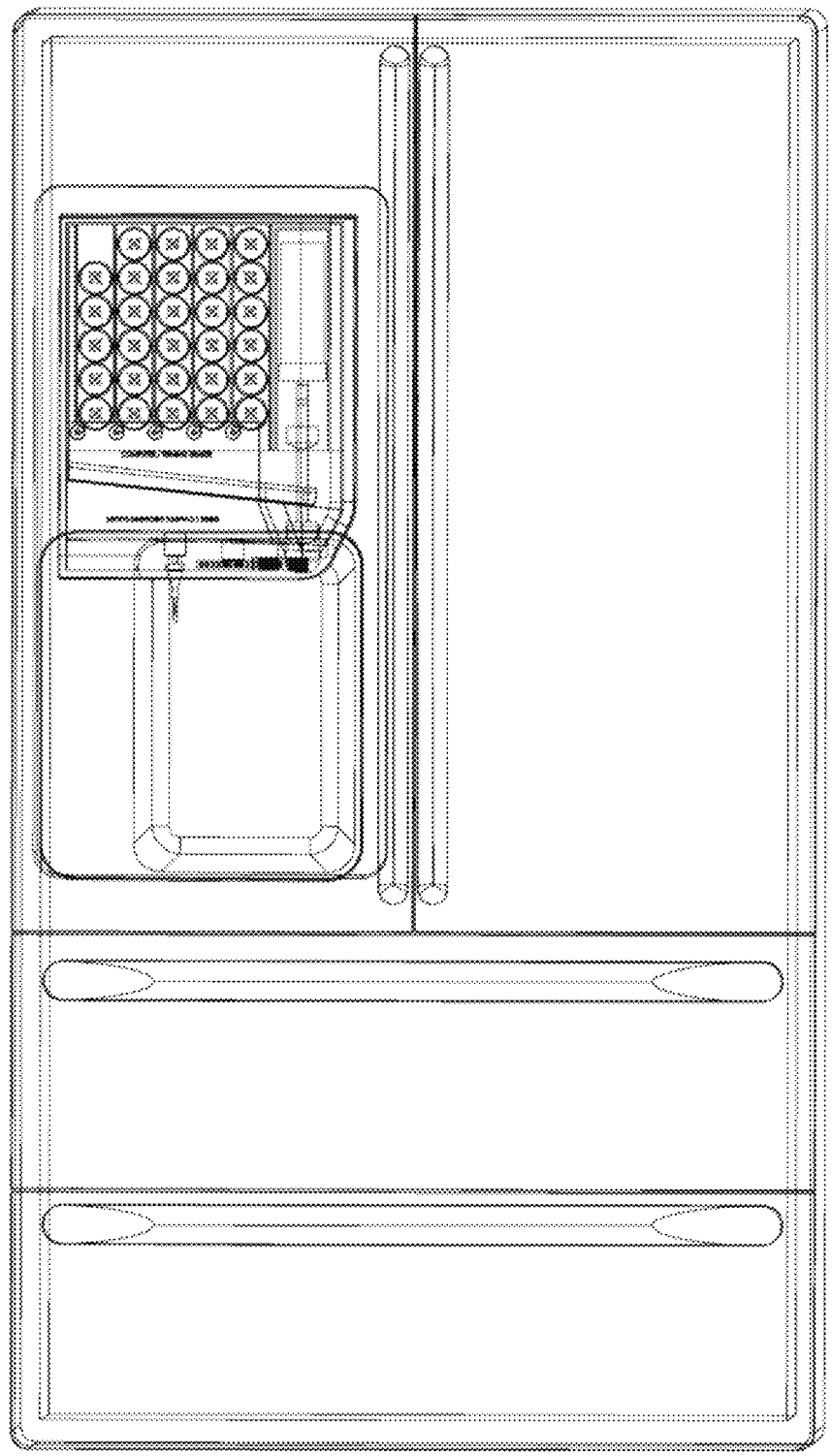
Figure 8:
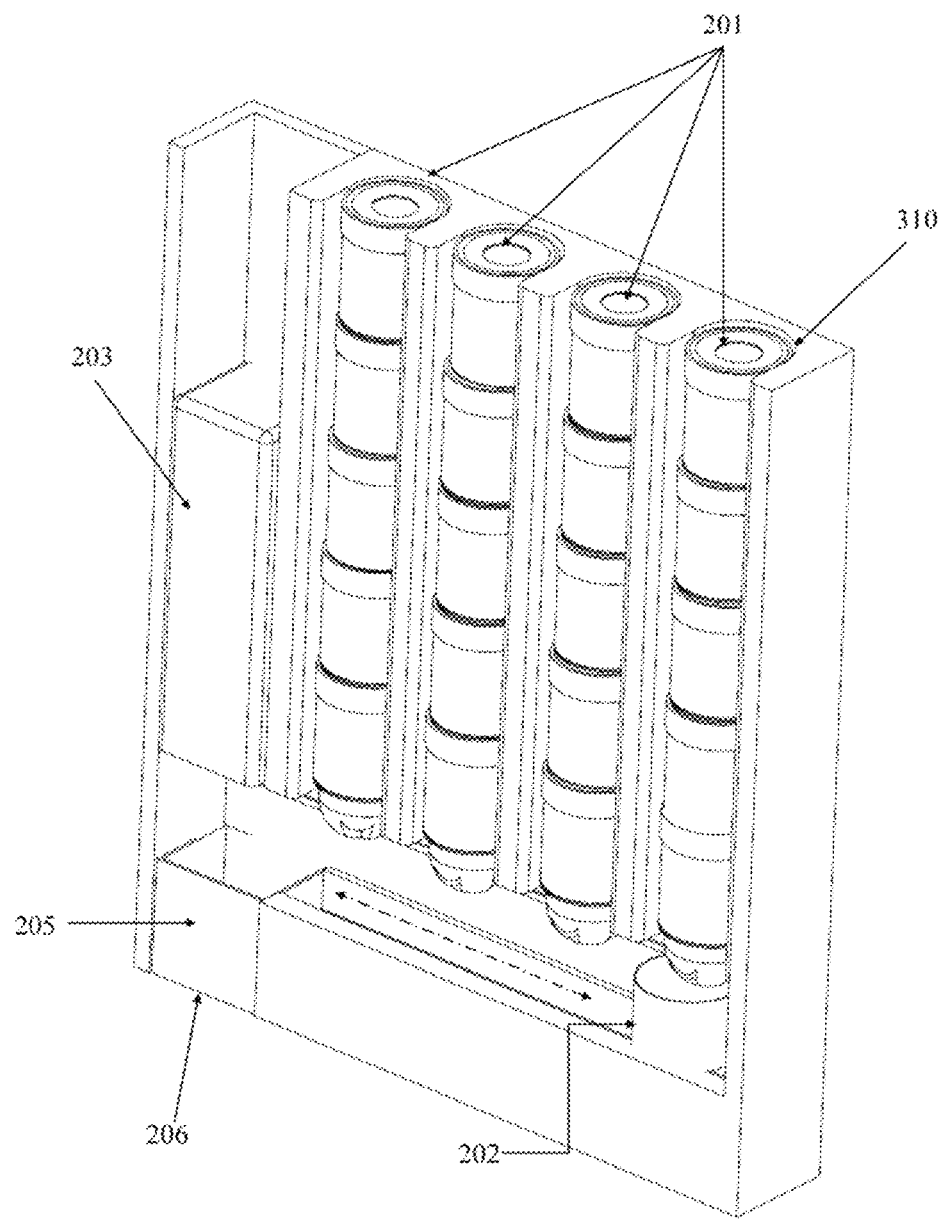
FIG. 8 is an illustration of an ice-cream/yogurt capsule dispenser according to some embodiments of the invention designed to be placed-within or to be installed in a separate freezing device/chamber/unit as an integral part-of a refrigerator chamber's door or a freezer chamber's door, e.g. of a two/three/four-doors refrigerator.

In specific embodiments, the capsule transport system comprises a rail 210 on which the capsule 201 rolls or slides (by gravity) towards the capsule receiver 205 after it is discharged from its respective compartment, as illustrated, e.g., in FIGS. 5G, 10 & 11. In alternative specific embodiments, the capsule transport system is an electric system that comprises a capsule holder 202 and an electric engine for moving the capsule holder 202 for delivering the capsule 201 from its respective compartment to the capsule receiver 205 as illustrated in FIGS. 5A, 8 & 9.

In specific embodiments, the capsule transport system comprises a rail 210 with a slot/notch/crack/chink/clef onto which a capsule 201 with a protrusion 403 around the main body can roll/slide over (by gravity) towards the capsule receiver 205 after it is discharged from its respective compartment 310.

In alternative specific embodiments, the capsule transport system is an electric system which comprise an electric push handle/arm for pushing the capsule 201 directly to the capsule receiver 205, after it is discharged from its respective compartment 310.

In alternative specific embodiments, the capsule transport system is an electric system that comprises an electric moving rail for delivering the capsule 201 directly to the capsule receiver 205, after it is discharged from its respective compartment.

The release of the capsule 201 from its compartment in the dispenser is carried out by any suitable means, such as an electric latch/catcher, electric shutter or other sealing mechanism that opens and closes according to demand, an electric plunger pushing the top capsule downwards until the lower capsule is released into the transport system, etc., or any combination thereof.

In specific embodiments, the capsule dispenser of the invention is designed to be integrated into a designated separated and independent freezer unit/device designed to maintain a predefined serving temperature of a ready-to-eat ice-cream/yogurt. This freezer unit is then designed to be integrated in a door of a freezer or a refrigerator without being effected by the temperature within the freezer- or refrigerator-chamber.

Accordingly, in specific embodiments, the present invention provides a capsule dispenser designed to be placed/integrated/installed in a separated and independent freezer unit/device designed to maintain a predefined serving temperature of a ready-to-eat ice-cream/yogurt, the freezer unit/device is located and installed in a door of a freezer chamber or in a door of a refrigerator chamber, the dispenser comprises: (a) a main body having: two or more compartments 310 designed to hold a plurality of disposable capsules 201 with ready-to-eat ice-cream/yogurt, and a capsule receiver 205 with an exit opening 206 through which the ready-to-eat ice-cream/yogurt discharges; (b) a capsule transport system, which is either electric or not, designed to deliver a single capsule 201 from its compartment to the capsule receiver 205; and (c) a hydraulic/electric/pneumatic piston or plunger 203 designed to move up and down for pushing the capsule 201 and/or the upper pressable seal/top 402 to serve the ready-to-eat ice-cream/yogurt from its capsule 201 through the exit opening 206, wherein the independent freezer unit/device comprises a door 501 to enable refilling new capsules 201 into the dispenser and to prevent cold/freezing air from exiting the freezer device. In specific embodiments, the capsule transport system comprises a rail 210 for the capsule 201 to roll or slide thereon (by gravity) towards the capsule receiver 205. In alternative specific embodiments, the capsule transport system is an electric system that comprises a capsule holder 202 and an electric engine for moving the capsule holder 202 for delivering the capsule 201 from its respective compartment to the capsule receiver 205.

In certain embodiments of the dispenser according to any of the embodiments above, the electric capsule transport system can move from side-to-side; back and forth; or up and down, around, or any combination thereof.

In certain embodiments, the capsule dispenser according to any of the embodiments above is designed to be integrated with/in any type of refrigerator, such as a side-by-side 2-doors fridge, regular fridge with an upper or lower freezer chamber, a 3-doors fridge, and a 4-doors fridge. In specific embodiments, the capsule dispenser is designed to be integrated with/in a vending machine. Accordingly, the present invention provides a refrigerator/freezer/vending machine comprising the dispenser of any one of the embodiments above.

In specific embodiments, the dispenser is integrated in the door of a cooling/refrigerator chamber or in the door of freezer chamber, e.g. of a refrigerator or of an independent freezer unit/device. In further specific embodiments, the rear section of the dispenser is a back door 501 that isolates the inner environment of the dispenser form the surroundings of the cooling/freezing chamber. In alternative embodiments, the dispenser is placed within an isolated chamber within the cooling/freezing chamber's door, the isolated chamber having a rear door 501 that isolates the inner environment of the dispenser form the surroundings of the cooling/freezing chamber. In either case, the door 501 of the dispenser can be opened to enable re-filling the dispenser with new capsules. FIGS. 5E and 5F illustrate two possibilities of such a door 501: one in which the compartments 310 holding the capsules 201 are within the door 501 (FIG. 5E); and another in which the door 501 is independent from said compartments (FIGS. 5F & 11). Other possibilities are: (i) that the door 501 is located at the upper section of the dispenser, thereby allowing insertion of the capsules 201 into the dispenser from its top (not shown); and (ii) that the door 501 is located outside of the refrigerator door and thereby allowing insertion of the capsules 201 into the dispenser from outside of the refrigerator, i.e. the front of the door (not illustrated).

In certain embodiments, the body of the dispenser of the invention from its back and/or front, top and/or bottom, and the sides can be transparent and/or in colors, in different types of shades, matte or glossy, with or without lighting.

In certain embodiments the rear door 501 of the dispenser of the invention can be transparent and/or in colors, in different types of shades, matte or glossy, with or without lighting.

In certain embodiments of the dispenser according to any of the embodiments above, the exit opening 206 further comprises or equipped-with a one-way seal/gasket designed to allow the ice-cream/yogurt to exit while preventing cold/freezing air from exiting the surroundings of the dispenser when not in use, i.e. the one-way seal/gasket allows ice-cream/yogurt to exit upon demand, while remaining close at all other times.

In certain embodiments, when the dispenser according to any of the embodiments above comprises an electric capsule transport system, the capsule holder 202 thereof is a ring, a vacuum-based suction element, a box/cup/chamber (202 in FIG. 8), arms (moving, shrinking, holding or fixed), clamp, conveyor, etc. In specific embodiments, the main body 401 of the capsule 201 is designed in accordance with the capsule holder 202 being used.

In certain embodiments, the capsule receiver 205 with an exit opening 206 includes, e.g. at its bottom, a permanent or a mobile bracket 320 designed to hold a capsule while the piston 203 presses the ice-cream/yogurt out of the capsule 201. The bracket 320 can be in any shape and configuration, such as U-shaped, clamp-like, square-shaped, etc. (see illustration in FIGS. 7 & 12).

After all the ice-cream/yogurt has been discharged from the capsule 201, the bracket 320, which has been holding the capsule when the piston 203 pressed the ice-cream/yogurt out of the capsule 201, is opened/released/moved/pushed/dragged/pulled aside (illustrated by a dashed arrow in FIGS. 10E and 11G) by moving it back/forth, up/down, sideways, or around, automatically or by the user, using an electric motor or manual handle/latch 330 (illustrated in FIGS. 7 & 10), thereby releasing the empty capsule and enabling its removal/falling outside the dispenser or to an optional used-capsule box/section/tray (not shown). After the empty capsule is released, the bracket 320 is closed/released/moved/pushed/dragged/pulled by moving it back/forth, up/down, around, or sideways to its place under the capsule receiver 205, automatically or by the user, using an electric motor or manual handle/latch 330, ready to receive the next capsule.

In certain embodiments of the dispenser according to any of the embodiments above, the bracket 320, can move in any direction, from side-to-side; back and forth; or up and down, around, in an arch, or any combination thereof.

In certain embodiments of the dispenser according to any of the embodiments above, the capsule receiver 205 acts as a compressor region in which the capsule 201 is compressed/pressed before it is discharged, e.g. to reduce its size and reduce waste volume. In certain complimentary embodiments, the piston/plunger 203 that is responsible for pressing the capsule or its seal/top 402 for discharging the ice-cream/yogurt, also acts as a compressor and is responsible also for compressing/pressing the capsule-either after pushing the ice-cream/yogurt out of the capsule or during (i.e. cramping/squeezing the entire capsule to discharge the ice-cream/yogurt). In specific embodiments, the plunger 203 compresses the capsule 201 for discharging the ice-cream therefrom, thereby simultaneously discharging the ice-cream while compressing the capsule 201 to reduce its size for disposal. In further specific embodiments, the compressing/pressing of the empty capsule is performed manually by the user, i.e. after its removal from the dispenser.

The piston/plunger 203 according to the invention may be electric, pneumatic or hydraulic, or any other suitable mechanism.

In certain embodiments, the dispenser according to any of the embodiments above further comprises a digital control panel 102 responsible for activating and controlling the work of the dispenser and its components, e.g. indicator lights, ice-cream/yogurt selection, pressing, mixing, and optionally discharging the empty capsule. The control panel 102 may be comprised of a touch screen or may comprise press-buttons, or both, optionally with connection to the internet (via, e.g., Wi-Fi, Bluetooth, wired connection, etc.). A user may use the control panel 102 to, e.g., activate the system, select a flavor, empty a used/empty/compressed capsule(s), monitor the remaining amount and type of capsules within the dispenser, order new capsules, etc.

In certain embodiments, the dispenser according to any of the embodiments above further comprises a sensor designed to alert the user about, e.g., problems, and/or lack of capsules and/or to identify the presence of a vessel for receiving the discharged ice-cream and/or identify the presence of an empty used capsule in the capsule receiver 205. Such a sensor can then instruct, e.g., via the digital control panel 102 or via a computerized system within or associated with the dispenser, to stop or postpone the pushing of the ice-cream until it identifies the presence of such a vessel, thereby preventing spillage of ice-cream and messing/polluting the refrigerator/dispenser and/or avoiding from serving another ice-cream/yogurt capsule until the used/empty/compressed capsule is removed from the capsule receiver 205.

In certain embodiments, the dispenser according to any of the embodiments above further comprises a computing system comprising at least one processor and at least one memory communicatively coupled to the at least one processor, the memory comprising computer-readable instructions that when executed by the at least one processor cause the computing system to provide a user with a serving of ice-cream/yogurt, e.g., by releasing a desired/selected capsule 201 from its compartment to the capsule transport system for delivery thereof to the capsule receiver 205, activating the plunger 203, and discharging the empty capsule. Other protocols may be used, and other components can be activated by the computing system.

In certain embodiments, the dispenser according to any of the embodiments above further comprises a mixer/blender pole/rod 103 located at or near to the exit opening 206 for mixing the ice-cream/yogurt, e.g. for preparing a milkshake or a frozen yogurt or smoothie or shakes, frozen fruits/vegetable/superfood shakes, frozen healthy shakes with various supplements, frozen cocktails, etc. In specific embodiments, the mixer 103 is located directly at the exit opening and extends underneath it such that when the ice-cream/yogurt exits, it mixes it. Alternatively, the dispenser is associated with the mixer 103 or the mixer 103 is an integral part of the dispenser positioned somewhat remotely from the exit opening, and the user, after filling a container with the ice-cream/yogurt simply moves the container towards the mixer 103 for mixing thereof, e.g., to prepare a frozen yogurt or milkshake. In further specific embodiments, the mixer 103 is hidden within the dispenser and exits/pops-out only on demand/when needed.

In certain embodiments, the dispenser according to any of the embodiments above further comprises an ice maker exit and and/or a water nozzle located at or in proximity to the exit opening 206, or the mixer/blender pole/rod 103 for serving ice or cold water. In such a configuration, the dispenser is associated with a water source and/or an ice-maker.

In certain embodiment, the dispenser according to any of the embodiments above is completely automatic, i.e., activation thereof by the control panel 102 leads to flavor selection, transport and ice-cream discharging (by pushing/pressing thereof), optionally capsule compression, and optionally also discarding thereof. Alternatively, in certain embodiment, the dispenser according to any of the embodiments above is semi-automatic, which means that some of the actions are manual, e.g., placing the capsule manually in the capsule receiver 205 after the dispenser provides it through a dedicated exit opening 601; pushing/pressing the ice-cream out the capsule; compressing/pressing the capsule 201; and/or discarding used/empty/compressed capsule, or any combination thereof.

Figure 6A:
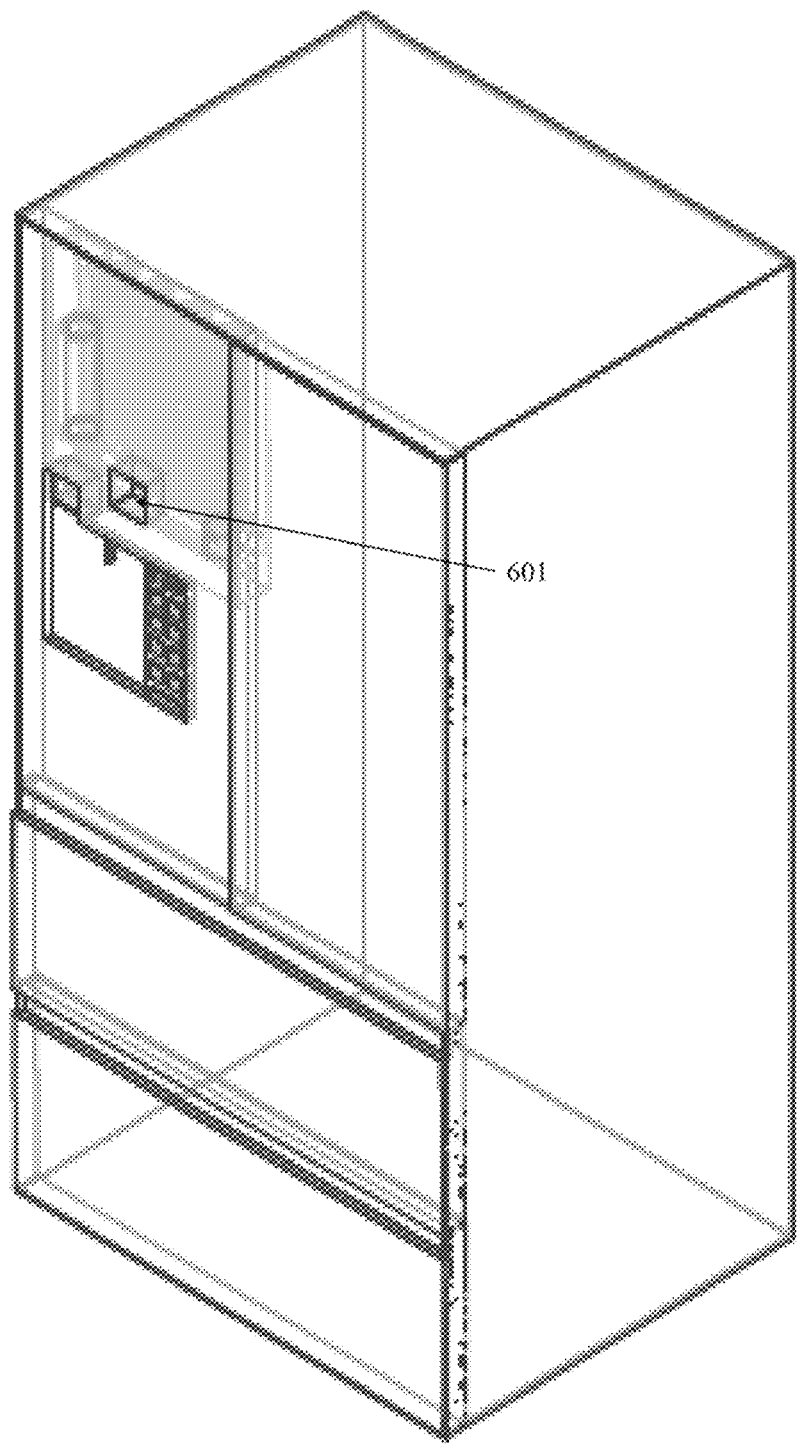
FIGS. 6A-6B are illustrations of refrigerators equipped with a semi-automatic dispenser of the invention showing a front opening for pulling an ice-cream/yogurt capsule.
Figure 6B:
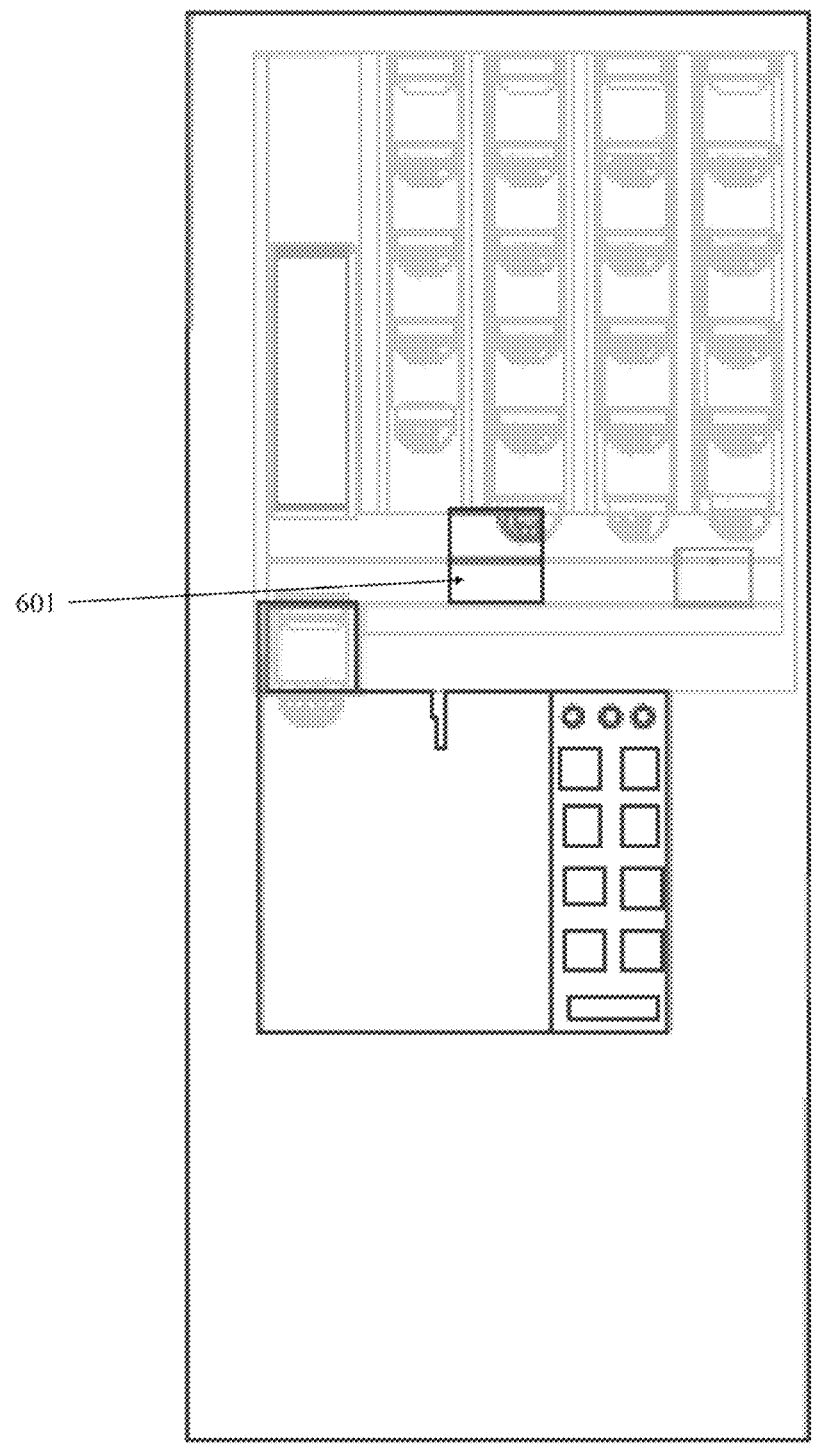

The present invention further provides a vending machine, a refrigerator or a freezer comprising a dispenser according to any of the embodiments above (see exemplary illustrations of such refrigerators in FIGS. 5 and 6). The refrigerator may be of any type, such as a side-by-side two doors refrigerator (FIG. 5A), four-doors refrigerator with two upper doors for the cooling chamber and two lower drawers or doors for the freezer chamber (FIGS. 5B & 6A), or a two-doors refrigerator with a lower freezer chamber (three doors), etc. The dispenser according to the invention can be integrated in any of the doors of the refrigerator, i.e. the door of the cooling chamber or the door of the freezer chamber.

In specific embodiments, the present invention provides a capsule dispenser for dispensing the capsules of the invention, said dispenser is designed to be installed in a separated and independent freezer unit designed to maintain a predefined serving temperature of a ready-to-eat ice-cream/yogurt and to be installed in a door of a freezer chamber or in a door of a refrigerator chamber, said dispenser comprises: (a) a main body having: two or more compartments 310 designed to hold a plurality of disposable capsules 201 with ready-to-eat ice-cream/yogurt, and a capsule receiver 205 with an exit opening 206 through which said ready-to-eat ice-cream/yogurt discharges, wherein said exit opening 206 comprises a one-way seal/gasket that allows said ice-cream/yogurt to exit while preventing cold/freezing air from exiting; (b) a rail 210 acting as a capsule transport system designed to deliver a single capsule 201 from its compartment to said capsule receiver 205; (c) permanent or mobile U-shaped, or any other shape, bracket 320 which holds the capsule while the piston 203 presses the ice-cream/yogurt out of the capsule 201; (d) a hydraulic/electric/pneumatic piston or plunger 203 designed to move up and down for pushing said ready-to-eat ice-cream/yogurt from its capsule 201; and (e) a mixer rod 103 located at or in proximity to said exit opening 206 for mixing the ice-cream/yogurt, wherein said independent freezer unit comprises a door 501 to enable refilling new capsules 201 into the dispenser and to prevent cold/freezing air from exiting said freezer device.

In further specific embodiments, the present invention provides a capsule dispenser for dispensing the capsules of the invention, said dispenser is designed to be installed in a separated and independent freezer unit designed to maintain a predefined serving temperature of a ready-to-eat ice-cream/yogurt and to be installed in a door of a freezer chamber or in a door of a refrigerator chamber, said dispenser comprises: (a) a main body having: two or more compartments 310 designed to hold a plurality of disposable capsules 201 with ready-to-eat ice-cream/yogurt, and a capsule receiver 205 with an exit opening 206 through which said ready-to-eat ice-cream/yogurt discharges, wherein said exit opening 206 comprises a one-way seal/gasket that allows said ice-cream/yogurt to exit while preventing cold/freezing air from exiting; (b) an electric capsule transport system designed to grab/hold and deliver a single capsule 201 from its compartment to said capsule receiver 205 that holds the capsule 201 while the piston 203 presses the ice-cream/yogurt out of the capsule 201, said system comprises a capsule holder 202 and an engine; (c) a hydraulic/electric/pneumatic piston or plunger 203 designed to move up and down for pushing said ready-to-eat ice-cream/yogurt from its capsule 201; and (d) a mixer rod 103 located at or in proximity to said exit opening 206 for mixing the ice-cream/yogurt, wherein said independent freezer unit comprises a door 501 to enable refilling new capsules 201 into the dispenser and to prevent cold/freezing air from exiting said freezer device.

The present invention further provides a method of providing ice-cream/yogurt to a user, the method comprising the steps of: (a) providing a dispenser according to any of the embodiments above; (b) filling the dispenser with at least one capsule 201 according to any of the embodiments above; and (c) activating the dispenser, selecting a desired flavor, and placing a vessel underneath the exit opening 206 for receiving discharged ice-cream/yogurt, thereby providing ready-to-eat ice-cream/yogurt to the user. In specific embodiments, the method further comprises a step of removing and discarding used/empty capsule(s), which is optionally compressed.

The present invention further provides a method for providing ice-cream/yogurt to a user, the method comprising the steps of: (a) providing a dispenser of the invention; (b) filling the dispenser with at least one capsule 201 according to the invention; and (c) activating the dispenser by a digital control panel 102, selecting a desired flavor, and placing a vessel underneath the exit opening 206 for receiving exiting/discharged ice-cream/yogurt, thereby providing ice-cream/yogurt to the user. In certain embodiments, the method is automatic.

FIGS. 9-12 illustrate the mechanism of action of capsule dispensers according to some embodiments of the invention: FIGS. 9A-9G illustrate a dispenser with an electronic capsule transport system and FIGS. 10 and 11 illustrate a dispenser with a rail 210 as the capsule transport system.

As illustrated in FIGS. 9A-9G, upon activation of the dispenser and selection of a capsule with desired/selected flavor/type, the capsule transport system is activated, moving the capsule holder 202 underneath the appropriate compartment/container. Then, a capsule 201 is released and either drops or actively delivered/drawn/pulled/grab/pushed/sucked/magnetizes from the compartment 310 into the capsule holder 202, which is then moved to deliver the selected capsule 201 to the capsule receiver 205. In specific embodiments, the holder 202 is lifted up towards the capsule as it is released from its compartment 310 to receive/grab it and optionally to assist in its release from its compartment. At this point, the capsule 201 is released from the capsule holder 202 into the receiver 205, and the holder 202 moves aside or remains open above the receiver 205 to enable the plunger 203 to pass through (as illustrated in the figures). Once the capsule 201 is placed/released from the capsule holder 202 underneath the piston/plunger 203, the plunger 203 descends (FIG. 9C) and presses the capsule 201 or its upper seal/top 402 to push the ice-cream/yogurt out of the capsule (FIG. 9D) and into a receiving vessel.

In specific embodiments, the capsule 201 may not be released from the capsule holder 202, as the capsule holder 202 dragged down into the receiver 205 while holding/grabbing the capsule 201, and the plunger 203 descends and presses the capsule 201 or its upper seal/top 402 to push the ice-cream out of the capsule, while the capsule holder 202 holding/grabbing or not holding/grabbing the capsule 201.

Notably, although not illustrated, as an additional option, the plunger 203 may also compress the capsule 201 to push out the ice-cream while compressing the capsule itself.

After all the ice-cream/yogurt is discharged from the capsule 201, the plunger 203 returns to place (FIG. 9E) thereby enabling discharging/discarding the empty capsule and optionally also enables the capsule holder 202 to move (if it did not release the capsule and moved away prior to the activation of the plunger) and receive the next capsule.

In certain embodiments, the starting point of the capsule holder 202 is at any desired location, such as underneath the plunger 203, underneath any one of the compartments, or anywhere else, where it waits until required/activated to move and pick a desired capsule. In specific embodiments, the starting point of the capsule the holder 202 is underneath the plunger 203.

Figure 9A:
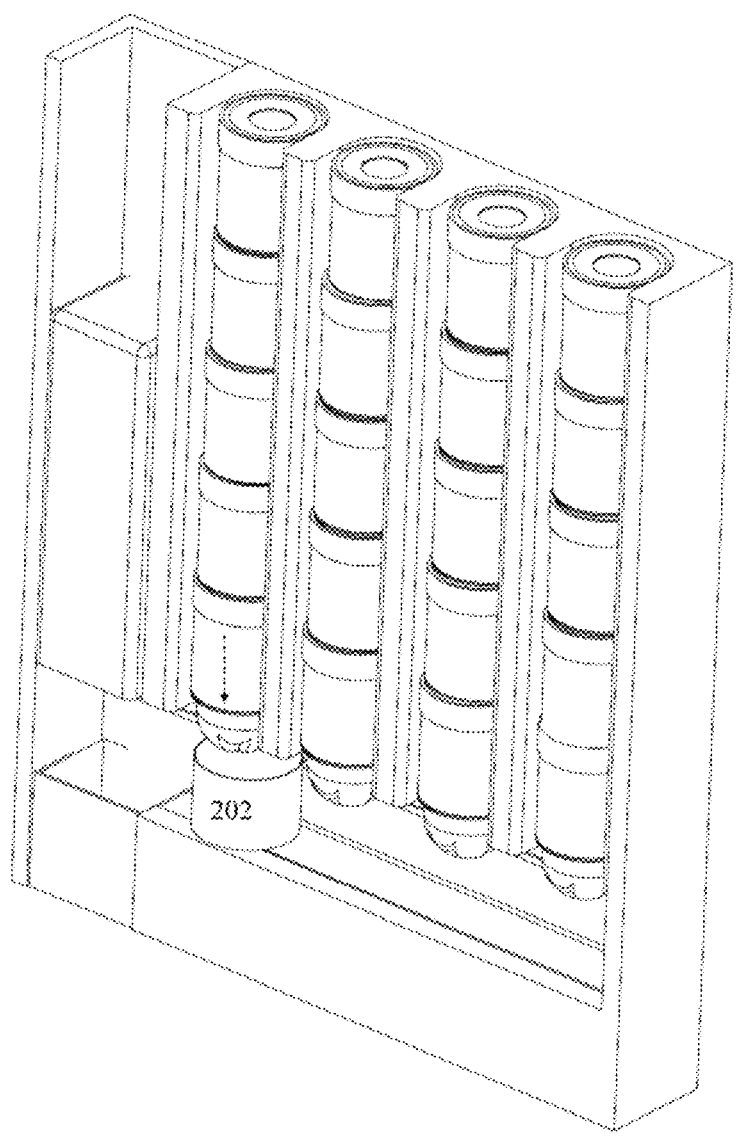
FIGS. 9A-9G illustrate the process of delivering an ice-cream/yogurt capsule according to a specific embodiment of the invention.
Figure 9B:
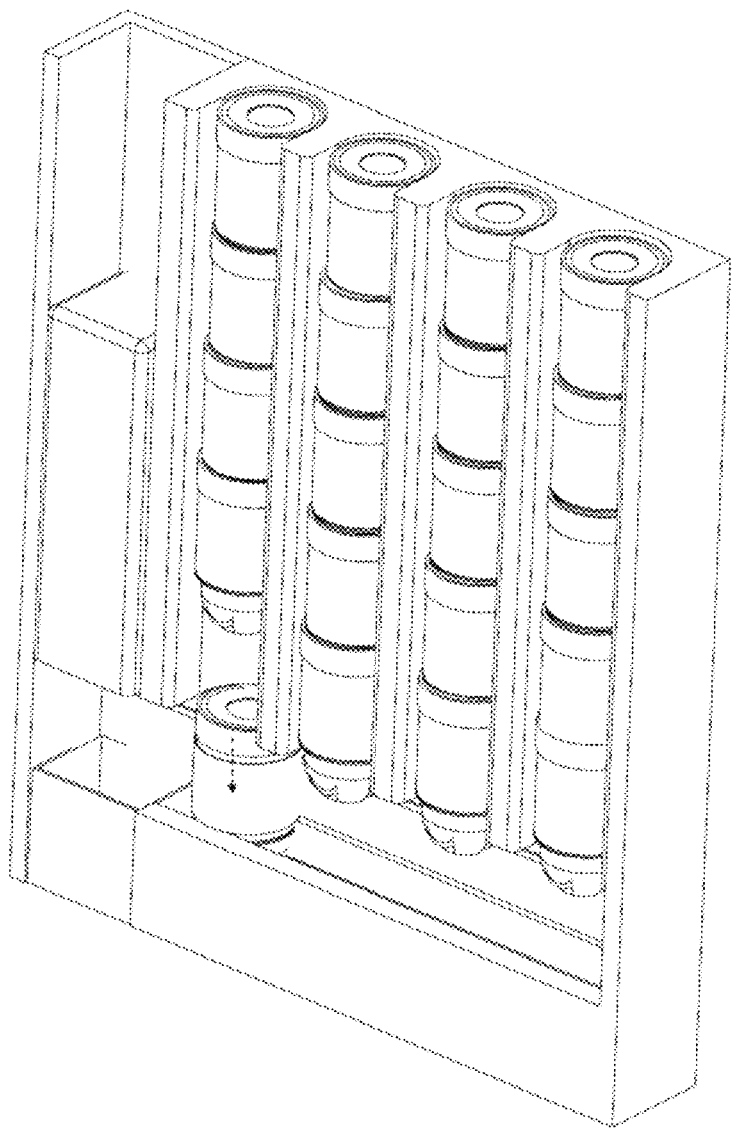
Figure 9C:
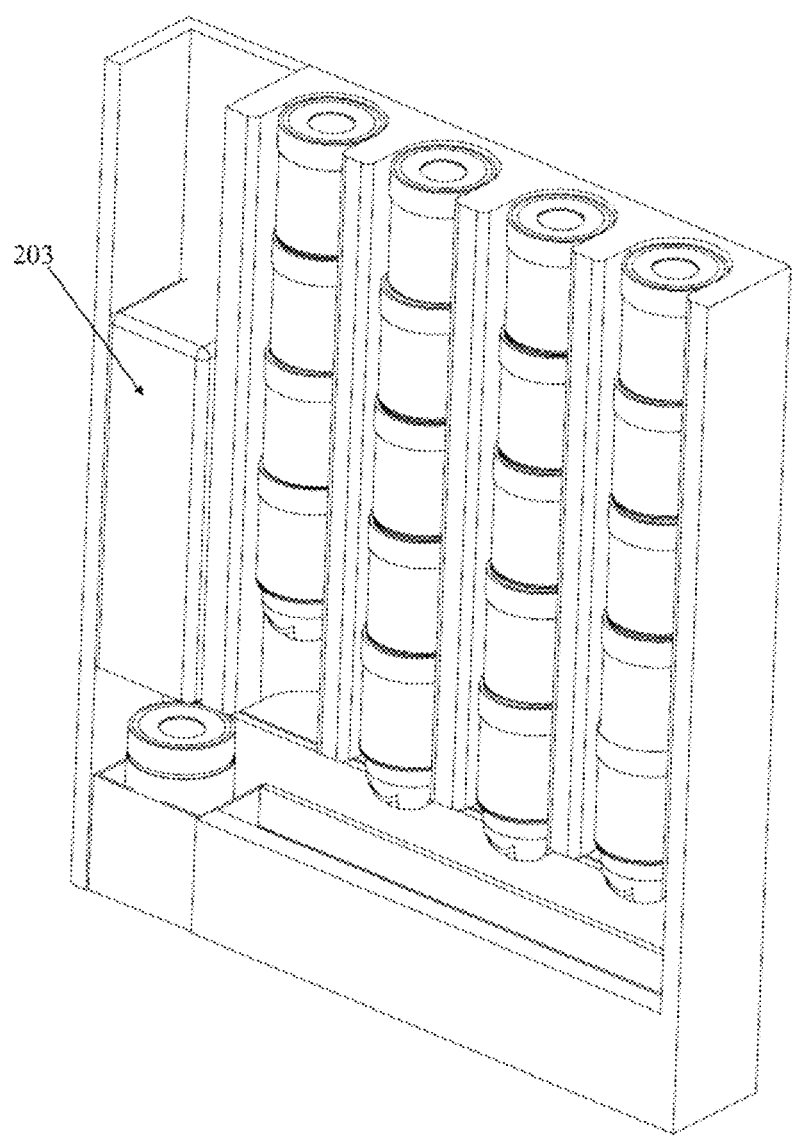
Figure 9D:
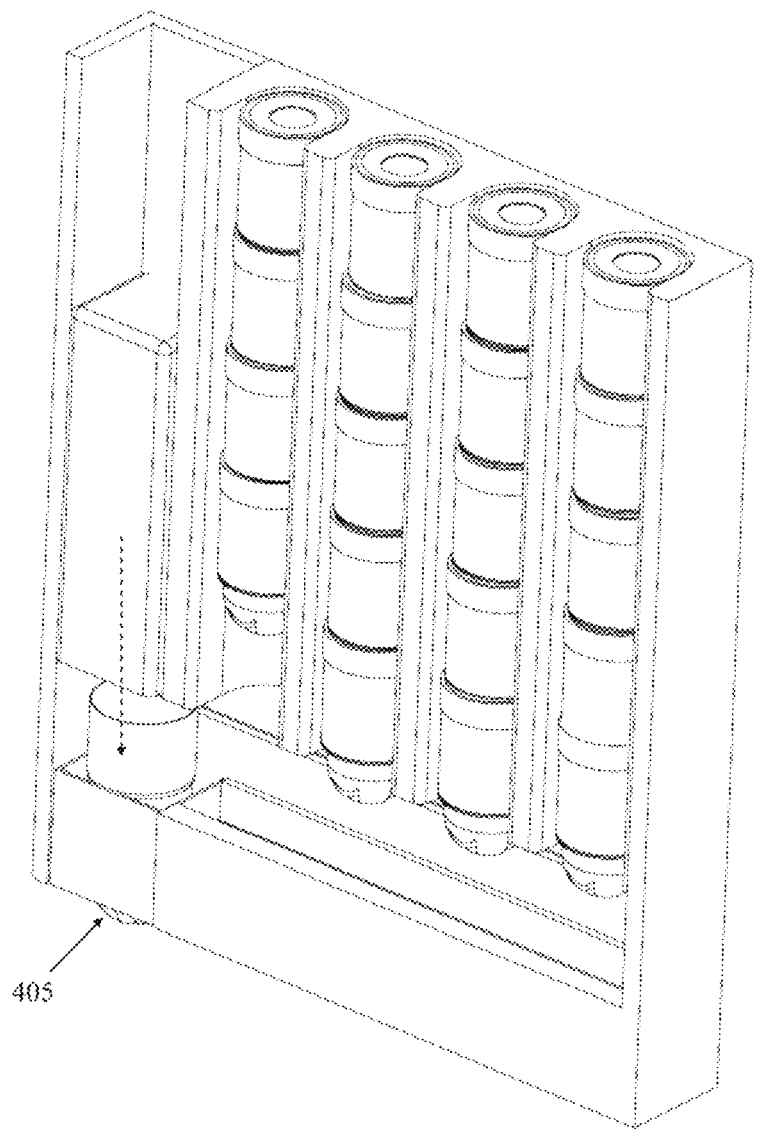
Figure 9E:
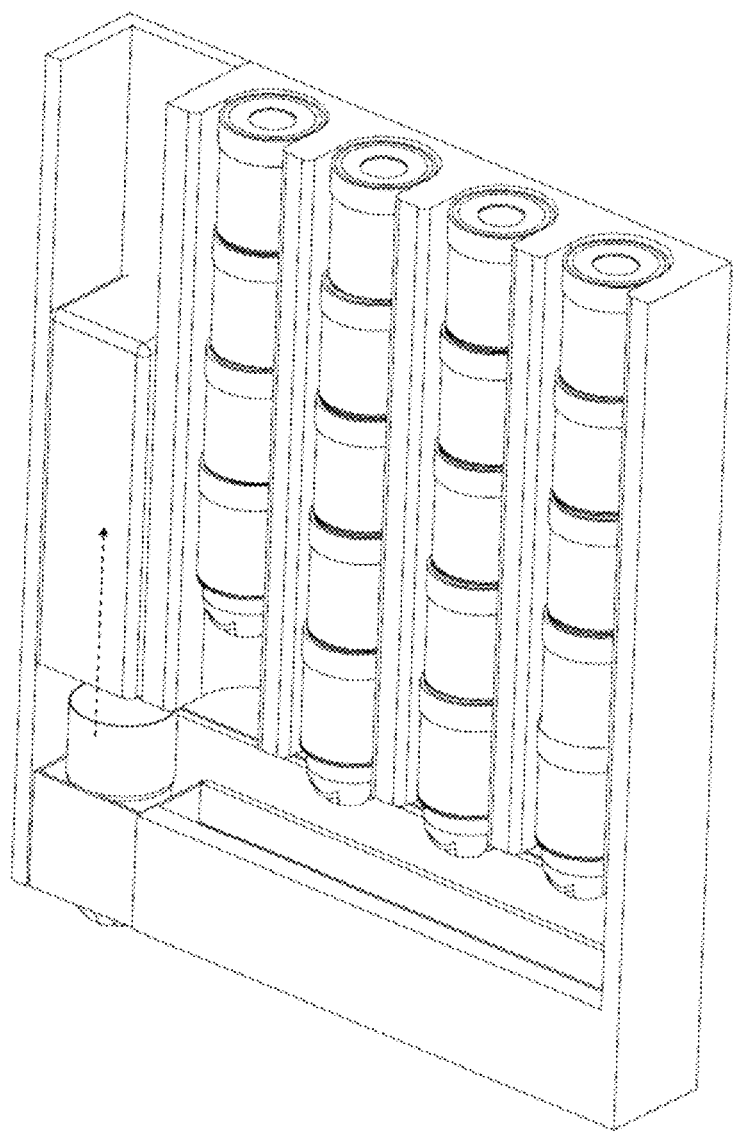
Figure 9F:
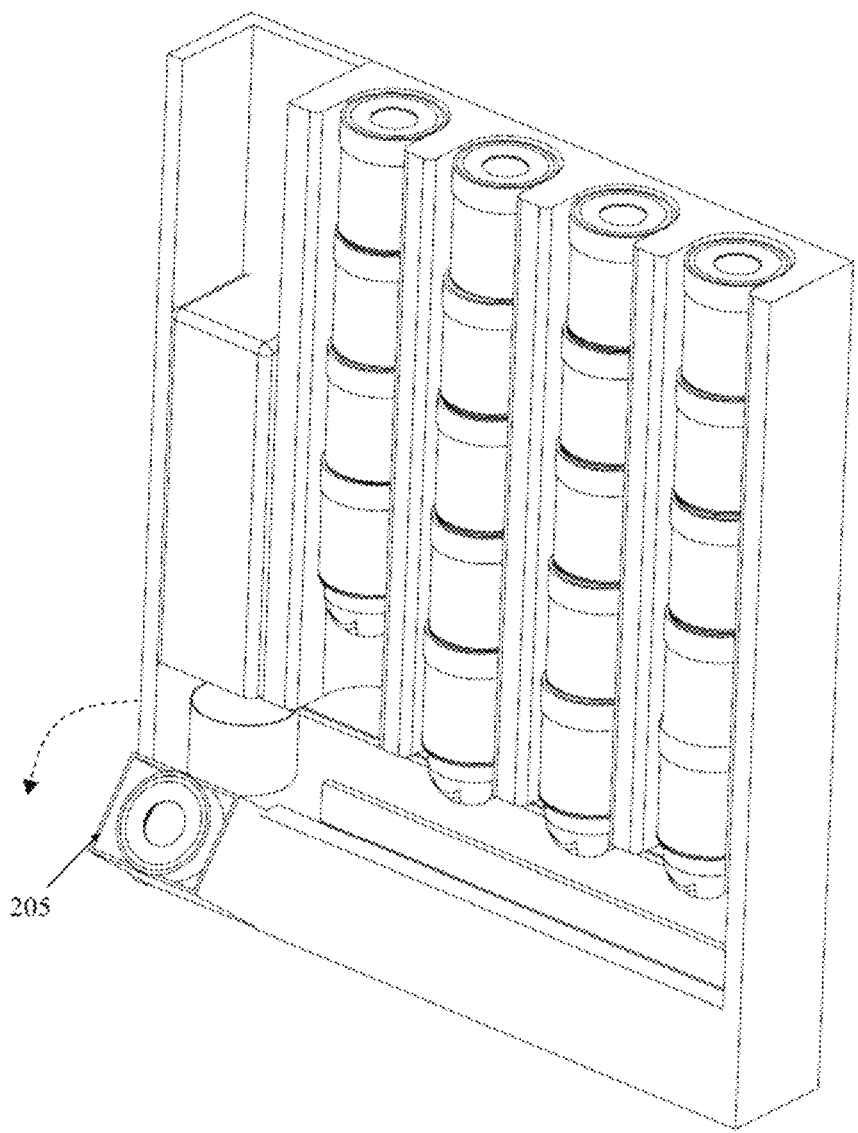
Figure 9G:
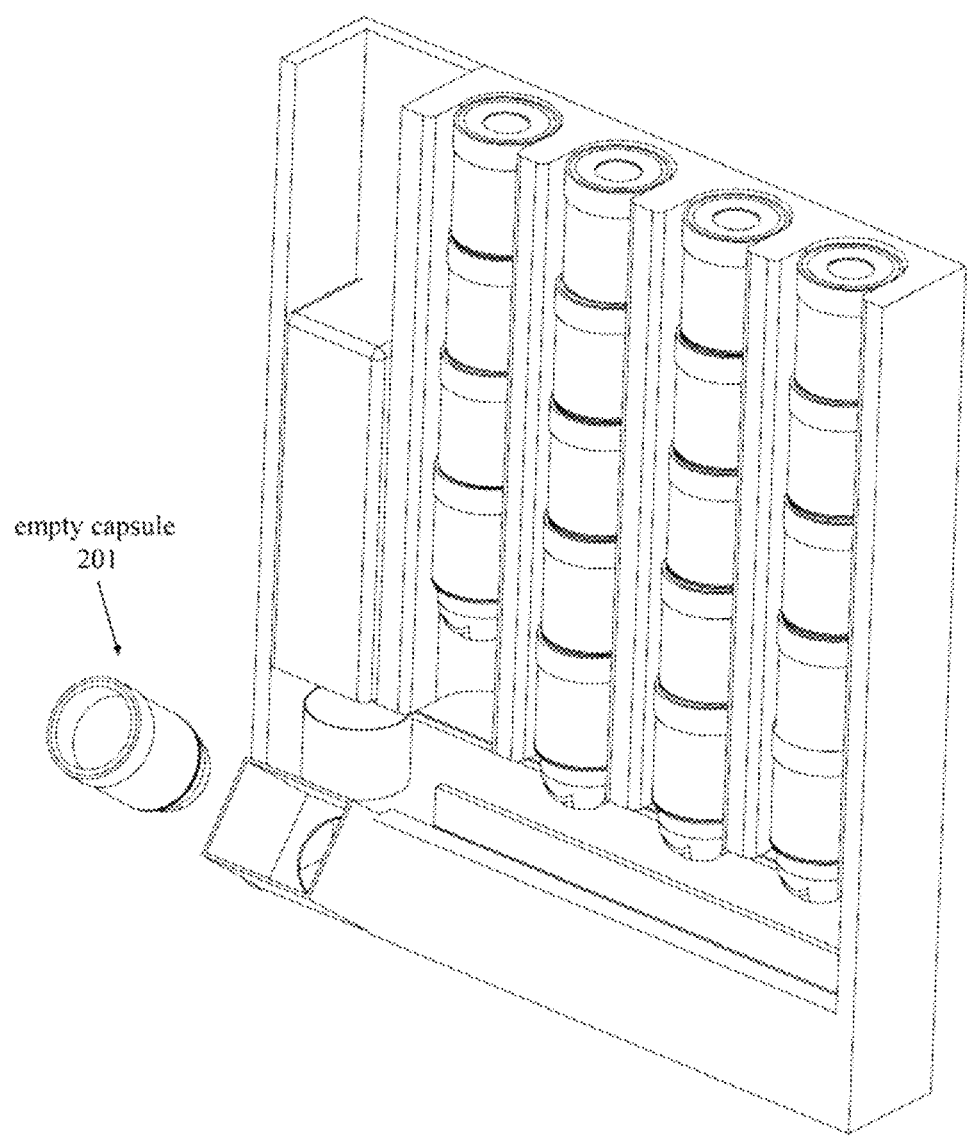
Figure 10A:
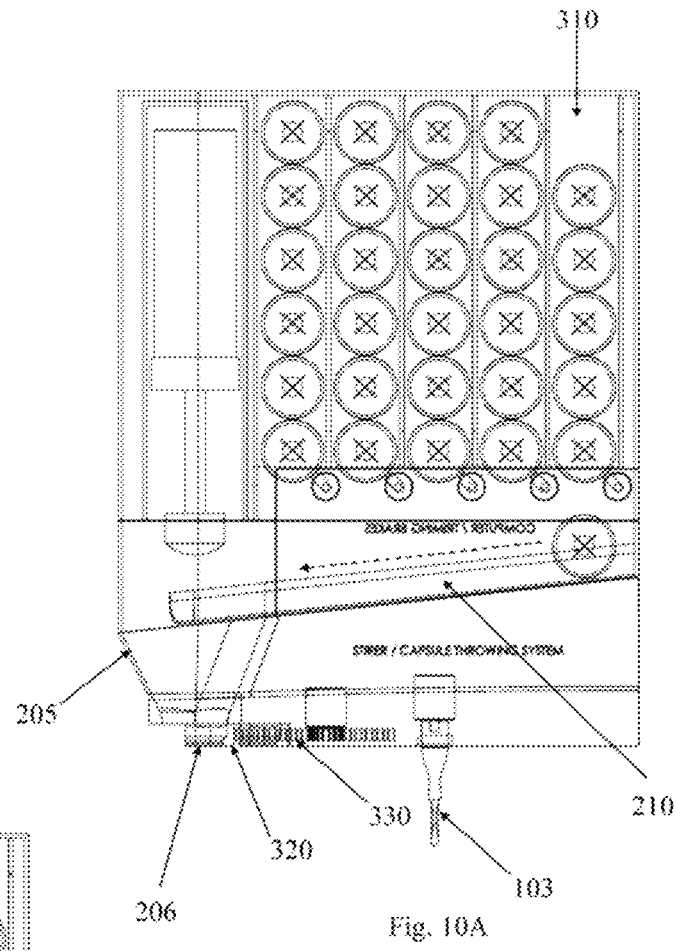
FIGS. 10A-10E illustrate the process of delivering an ice-cream/yogurt capsule according to another specific embodiment of the invention.
Figure 10B:
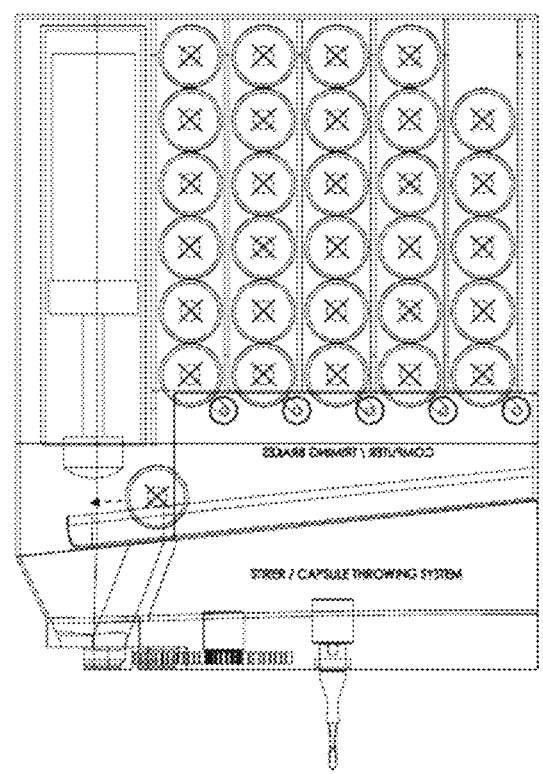
Figure 10C:
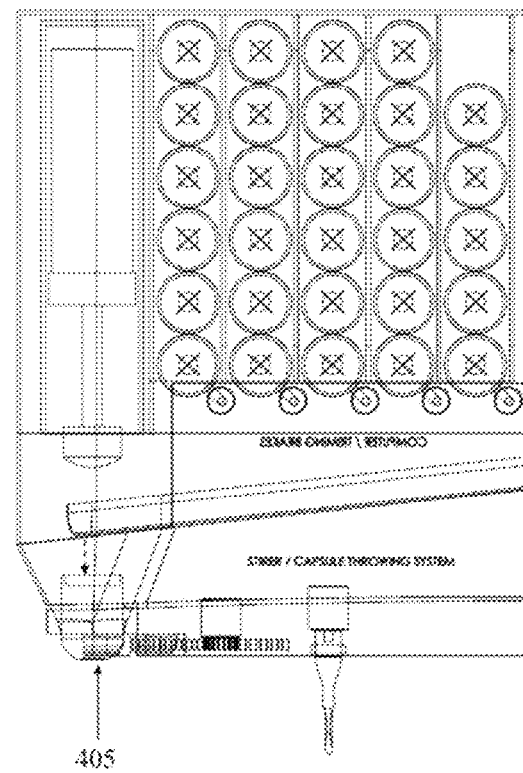
Figure 10D:
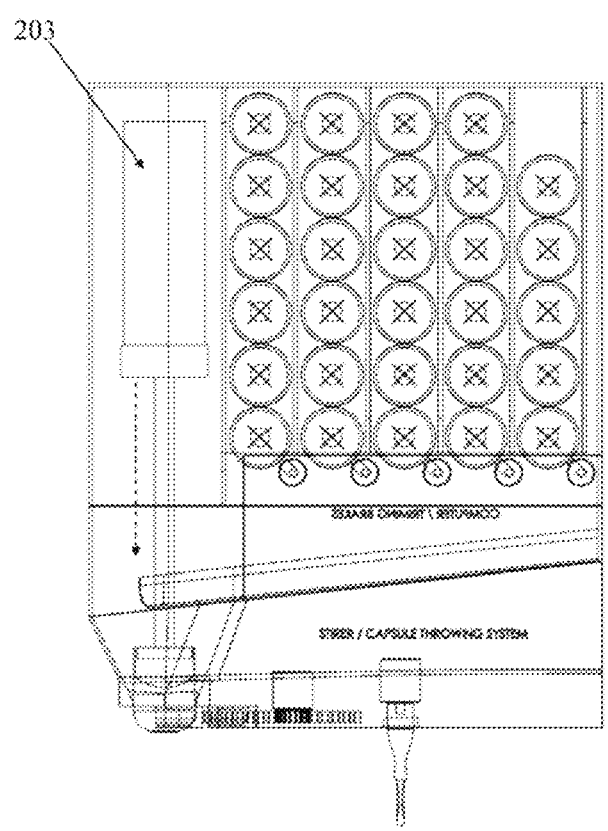
Figure 10E:
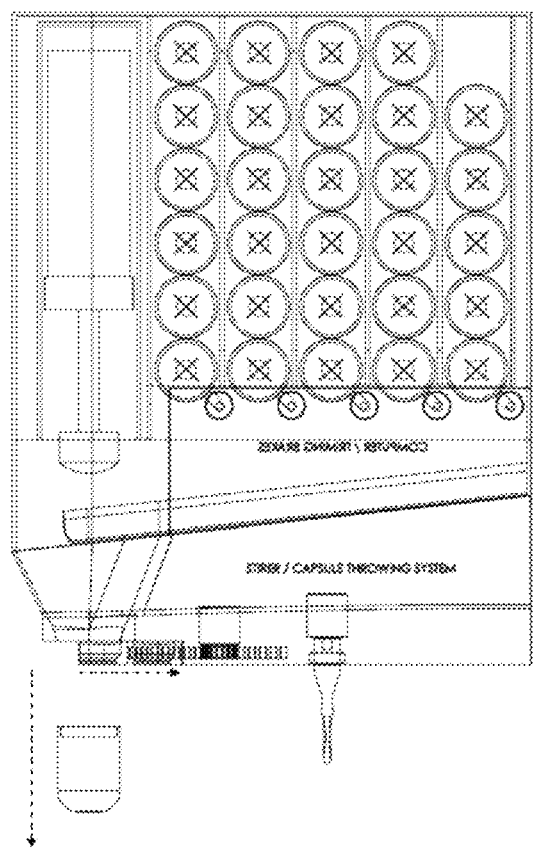
Figure 11A:
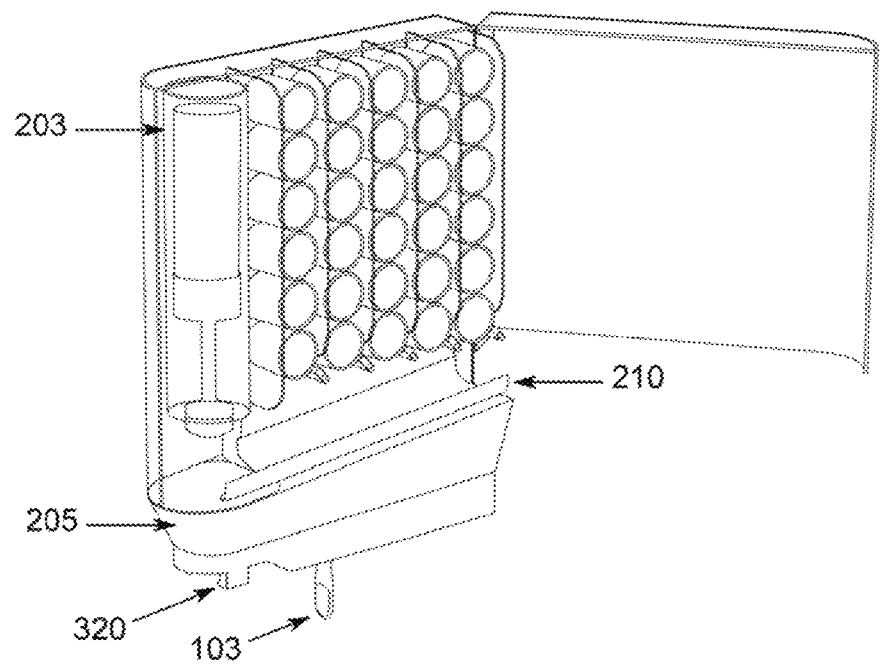
FIGS. 11A-11G are color illustrations of the process of FIG. 10.
Figure 11B:
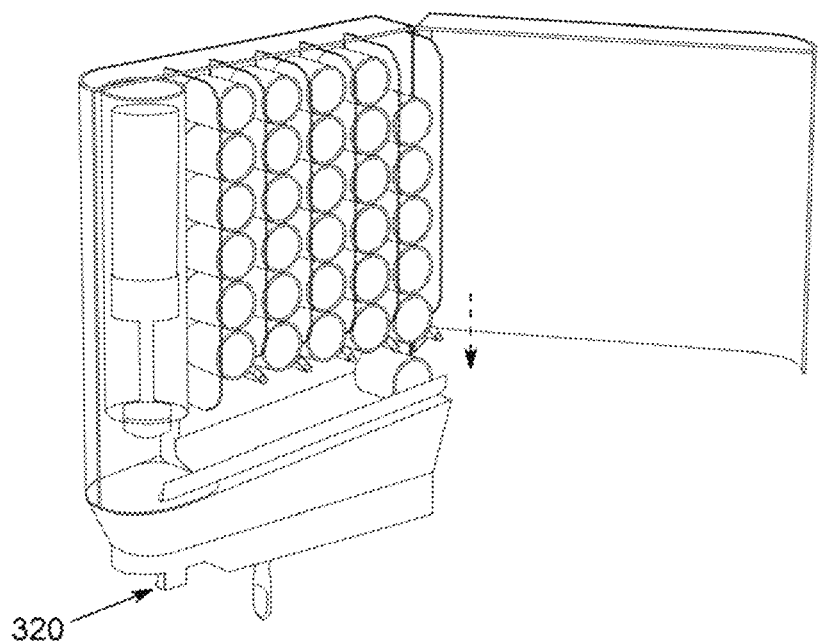
Figure 11C:
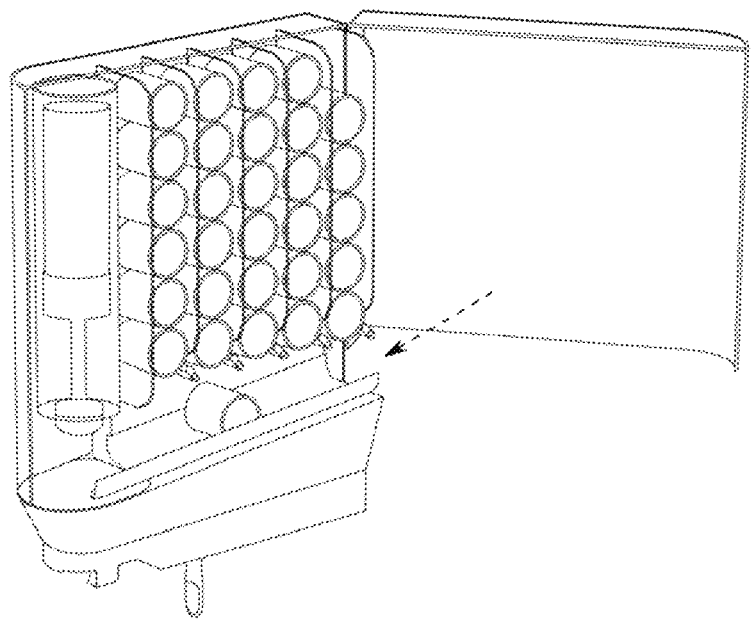
Figure 11D:
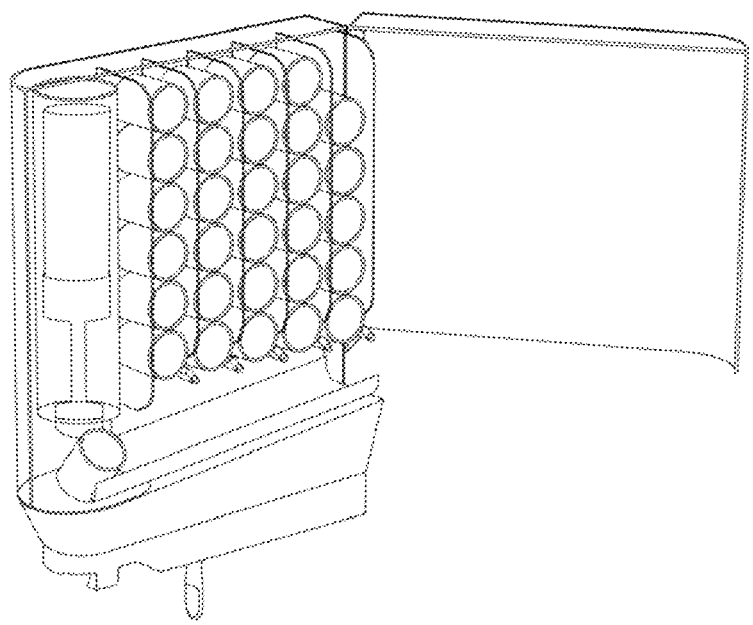
Figure 11E:
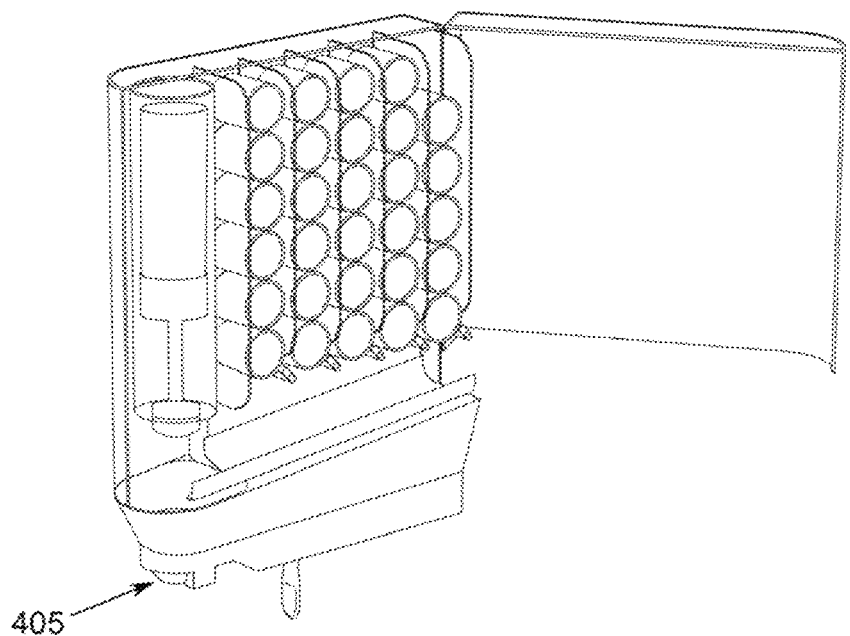
Figure 11F:
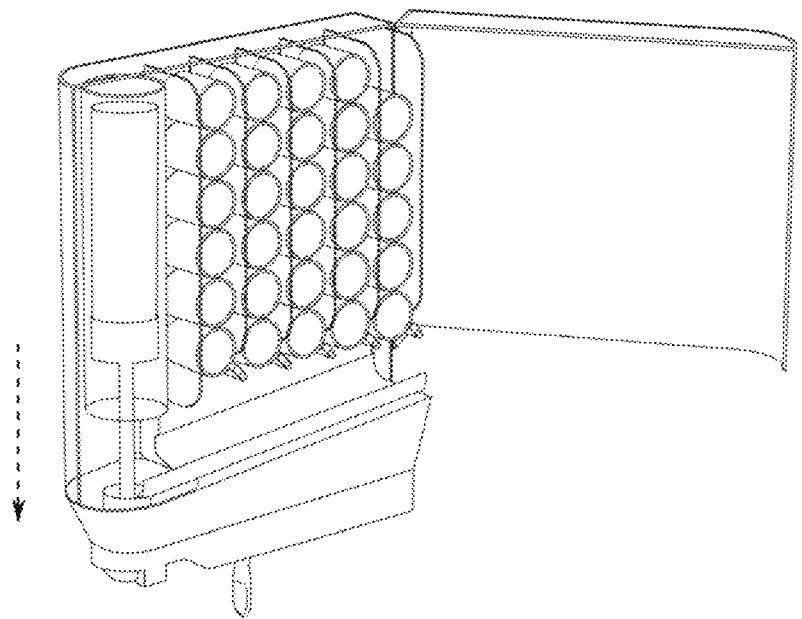
Figure 11G:
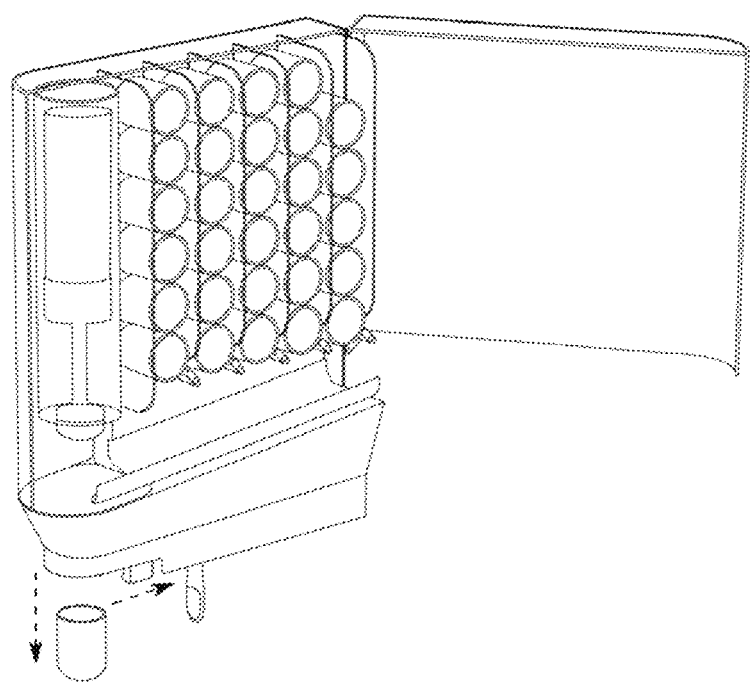

In specific embodiments, the receiver 205 is opened outwardly towards the user automatically or manually and the empty capsule is released and removed outside the dispenser by the user to the garbage/recycle bin (FIGS. 9F-9G). Then the receiver 205 is pushed/closed back to place, ready to receive the next capsule. In alternative specific embodiments, when the capsule is held in place with a bracket 320, the empty capsule is discharged/removed by moving the bracket 320 away or opening it (e.g., in a clamp-like movement). In alternative specific embodiments, when the capsule is held in place with a bracket 320, the empty capsule is discharged/removed by moving the bracket 320, e.g., up or down to open or close it (e.g., in an axis movement).

As illustrated in FIGS. 10A-10E (as well as in FIGS. 11A-11G, which are color illustrations therefor), upon activation of the dispenser and selection of a capsule with desired/selected flavor/type, the desired capsule is released/pushed/delivered from its compartment 310 to a rail 210 onto which the capsule slides/rolls (by gravity) towards the capsule receiver 205. Once the capsule 201 is placed in the receiver 205 underneath the piston/plunger 203, the plunger 203 descends (FIGS. 10D & 11F) and presses the capsule 201 or its upper seal/top 402 to push the ice-cream/yogurt out of the capsule and into a receiving vessel. Notably, although not illustrated, as an additional option, the plunger 203 may also compress the capsule 201 to push out the ice-cream while compressing the capsule itself.

After all the ice-cream/yogurt is discharged from the capsule 201, the plunger 203 returns to place (FIGS. 10E & 11G) thereby enabling discharging/discarding the empty capsule and receive the next capsule. As illustrated, the empty capsule is discharged/falls out of the dispenser or to an optional used-capsule box/section/tray (not illustrated). Alternatively, the capsule receiver 205 may tilt (automatically or manually) to enable extraction of the capsule (illustrated in FIGS. 9F-9G).

Figure 7A:
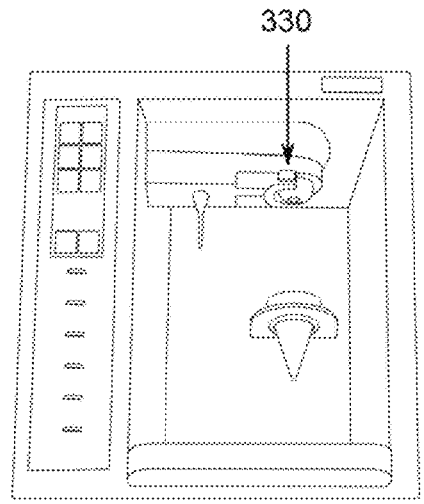
FIGS. 7A-7C are closeup illustrations of a control panel and an ice-cream/yogurt capsule dispenser of the invention.
Figure 7B:
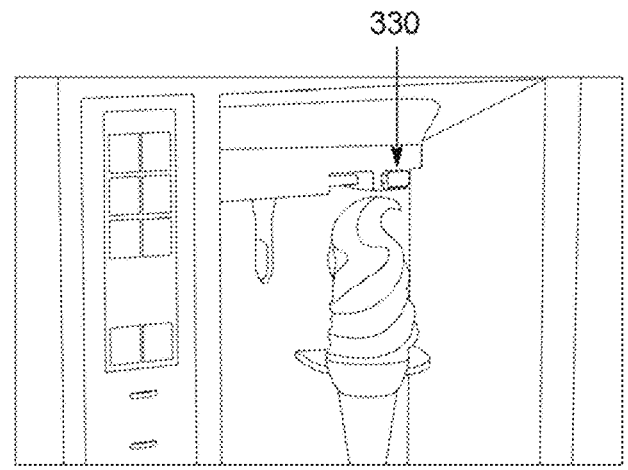
Figure 7C:
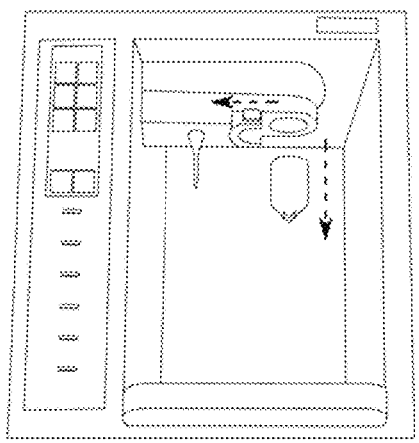
Figure 12A:
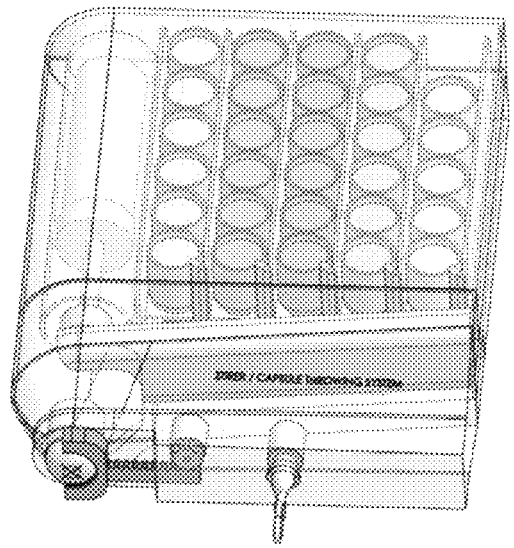
FIGS. 12A-12C illustrate a mechanism for holding a capsule during its squeezing and for releasing the capsule thereafter.
Figure 12B:
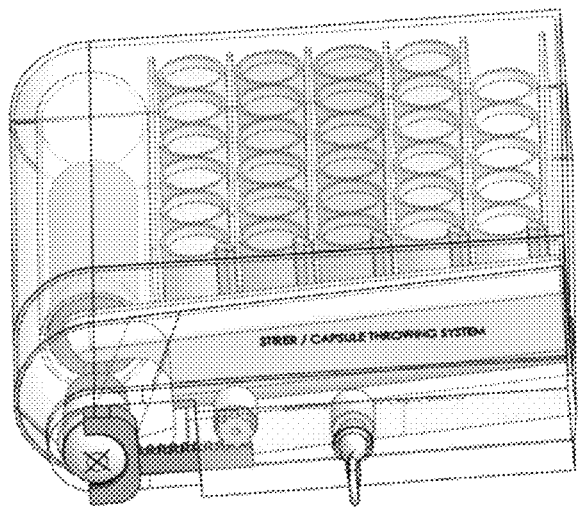
Figure 12C:
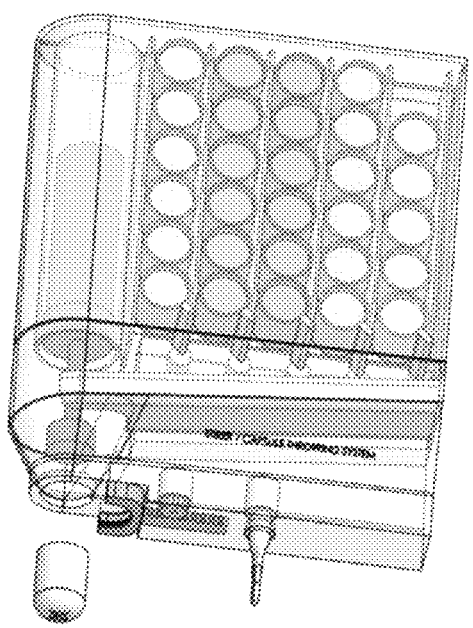

In specific embodiments, the capsule receiver 205 with an exit opening 206 includes in its bottom a permanent or mobile U-shaped, or any other shape, bracket 320, which holds the capsule while the piston 203 pressing the ice-cream/yogurt out of the capsule 201 (FIG. 12). Then, after all the ice-cream/yogurt is discharged from the capsule 201, the bracket 320 is opened/moved/released/pushed/dragged/pulled aside automatically or by the user, using an electric motor or manual handle/latch 330 (FIGS. 7 & 12) to thereby release the empty capsule and allowing its removal/falling outside the dispenser (FIGS. 10E and 11G) or to an optional used-capsule box/section/tray (not illustrated). Then, the bracket 320 is moved/dragged/pulled/released/pushed/closed back to its place under the capsule receiver 205, automatically or by the user, using an electric motor or manual handle/latch 330, ready to receive the next capsule (FIGS. 7 & 12).

In specific embodiments, the control panel 102 or some other indicator (e.g., light) further indicates the user that the receiver 205 contains a used/empty/compressed capsule and needs emptying before serving the next ice-cream/yogurt capsule. In alternative specific embodiments, the used/empty/compressed capsule is released into a used-capsule box/section/try, in which used/empty/compressed capsule are accumulated before needing to empty it. In such a configuration, the control panel 102 may further indicate the user that the used-capsule box/section/tray is full and needs emptying.

In certain embodiments, and as illustrated in FIG. 1 the capsule 201 according to any of the embodiments above, comprises an integral nozzle 405, and when the capsule 201 is placed within the receiver 205 of the dispenser, the nozzle 405 extend outside the exit opening 206 and the one-way seal/gasket (illustrated in FIGS. 9D, 10C, 11E, in which the nozzle 405 protrudes outwardly from the dispenser), thereby preventing contamination of the dispenser and its components with ice-cream/yogurt that exits the capsule. Notably, after removal of the capsule from the receiver 205, the one-way seal/gasket re-seals and isolates the interior from the exterior.

In certain embodiments of the capsule 201 according to any of the embodiments above, and as illustrated in FIGS. 2D, 2F, 3D, 3E and 3K, the breakable grooved bottom 410 breaks when pressure is applied by the piston 203, and creates a kind of nozzle ("pseudo-nozzle") which extend outside the exit opening 206 thereby preventing contamination of the dispenser and its components with ice-cream/yogurt that exits the capsule. Notably, after removal of the capsule from the receiver 205, the one-way seal/gasket re-seals and isolates the interior from the exterior.

As noted above, the dispenser of the invention may be fully automatic, in which case all the above steps are carried out automatically by the push of a button. Alternatively, it may be semi-automatic, in which case the user can instruct the dispenser to move from one action to the other by pressing a button when needed and with user manual intervention, e.g. in loading the capsule to the receiver 205, thereby controlling the speed of the process and enabling the user to pose if desired.

One advantage of the method according to the invention is that it does not require the user to open and look through the content of the freezer chamber for the ice-cream box, and then to use tools to extract the ice-cream to a vessel for consumption, which is a long process that forces the user to search for ice-cream and touch the frozen content of the freezer, which is not pleasant. Alternatively, the use of the dispenser is simple and easy to use, comfortable, fun, and clean. Also, the dispenser alerts the user if it runs-out (or about to run-out) of a specific flavor or if all the capsules are gone, which obviate the need to guess and check if there is enough ice-cream left in the box. Another important advantage is the fact that no cleaning is needed: when using the dispenser of the invention to serve ice-cream, no tools are used, the dispenser remains clean, and the remaining capsule is simply discarded, so no cleaning is required.

What is claimed is:

1. A disposable ice-cream/yogurt capsule 201 comprising:
a main body 401 with an upper section and a lower section;
an upper pressable seal/top 402 located at said upper section, wherein said upper pressable seal/top 402 has a sunken space/gap fitting and an outwardly-curved nozzle 405 attached to the lower section;
a predefined amount of ready-to-eat ice-cream/yogurt deposited within said main body 401;
a breakable grooved bottom 410 located at the outwardly curved nozzle at said lower section and designed to: (i) isolate said ice-cream/yogurt from the surrounding during transportation and storage; (ii) prevent leaking of capsule contents; and (iii) break to allow said ice-cream/yogurt to exit out of the capsule upon application of pressure onto the upper pressable seal/top 402;
an opening located at said lower section; and
a bottom seal/cover 406 placed/attached over said opening and designed to: (i) isolate said ice-cream/yogurt from the surrounding during transportation and storage; (ii) prevent leaking of capsule contents; and (iii) break to allow said ice-cream/yogurt to exit out of the capsule via said opening upon application of pressure onto the said upper pressable seal/top 402.

2. The disposable ice-cream/yogurt capsule 201 of claim 1, further comprising a protrusion 403 around said main body 401 to enable gripping of the capsule.

3. The disposable ice-cream/yogurt capsule 201 of claim 1, wherein said upper pressable seal/top 402 is pushed into said main body 401 for pushing said ice-cream/yogurt through said opening.

4. The disposable ice-cream/yogurt capsule 201 of claim 1, wherein said main body 401 is rigid and pressing said upper pressable top/seal 402 pushes said ice-cream/yogurt through said opening.

5. The disposable ice-cream/yogurt capsule 201 of claim 1, wherein said main body 401 is collapsible and pressing the main body 401 pushes said ice-cream/yogurt outside the capsule.

6. The disposable ice-cream/yogurt capsule 201 of claim 1, wherein the outwardly-curved nozzle 405 located at said opening and designed to shape the ice-cream/yogurt as the ice-cream/yogurt exits the capsule.

7. The disposable ice-cream/yogurt capsule 201 of claim 6, wherein said upper pressable seal/top 402 is shaped to fit said outwardly-curved nozzle 405 to enable stacking one capsule 201 onto another.

8. The disposable ice-cream/yogurt capsule 201 of claim 1, wherein said upper pressable seal/top 402 is shaped to fit the breakable grooved bottom 410 of the capsule to enable stacking one capsule 201 onto another.

9. A capsule dispenser for dispensing a capsule 201, the capsule dispenser adapted to be installed in a vending machine or a refrigerator/freezer or a separate and independent freezer unit, the capsule dispenser comprising:
a main body having: two or more compartments 310 designed to hold a plurality of said capsules 201 with ready-to-eat ice-cream/yogurt, and a capsule receiver 205 with an exit opening 206 through which said ready-to-eat ice-cream/yogurt discharges;
a capsule transport system designed to deliver a single capsule 201 from compartment to said capsule receiver 205; and
a hydraulic/electric/pneumatic piston or plunger 203 designed to move up and down for pushing said ready-to-eat ice-cream/yogurt from said capsule 201,
wherein said exit opening 206 further comprises a one-way seal/gasket that allows said ice-cream/yogurt to exit while preventing cold/freezing air from exiting.

10. The capsule dispenser of claim 9, wherein said main body further comprises a bracket 320 for carrying/holding the capsule.

11. The capsule dispenser of claim 9, wherein the capsule dispenser is adapted to be installed within the separate and independent freezer unit that is designed to maintain a predefined serving temperature of said ready-to-eat ice-cream/yogurt, wherein said freezer unit comprises a door 501 to enable refilling new capsules 201 into the dispenser and to prevent said cold/freezing air from exiting said freezer device.

12. The capsule dispenser of claim 11, wherein said freezer unit is designed to be installed in a door of a freezer chamber or in a door of a refrigerator chamber.

13. The capsule dispenser of claim 9, wherein:
   said capsule transport system is an electric transport system, said electric capsule transport system is moved from side-to-side; back and forth; or up and down, or any combination thereof,
   said electric capsule transport system further comprises one of:
   a capsule holder 202 for delivering the capsule 201 directly to the capsule receiver 205 after the capsule 201 is discharged from respective compartment,
   an electric push handle/arm designed to push the capsule 201 directly to the capsule receiver 205 after the capsule 201 is discharged from respective compartment,
   an electric moving rail for delivering the capsule 201 after the capsule 201 is discharged from respective compartment.

14. The capsule dispenser of claim 9, wherein said capsule transport system is a rail 210 onto which a capsule 201 can roll/slide over; wherein said rail 210 comprises:
   a slot/notch/crack/chink/clef designed to enable a capsule 201 with protrusion 403 around the main body to roll/slide over in a straight manner;
   an electric push handle/arm designed to push the capsule 201 directly to the capsule receiver 205 after the capsule 201 is discharged from respective compartment.

15. The capsule dispenser of claim 9, wherein said capsule receiver 205 further acts as a capsule compressor region in which said capsule 201 is compressed before discharging.

16. The capsule dispenser of claim 9, wherein said piston/plunger 203 is responsible also for compressing/pressing said capsule 201.

17. The capsule dispenser of claim 9, further comprising:
   a digital control panel 102 responsible for activating and controlling the work of the dispenser;
   a mixer rod 103 located at or in proximity to said exit opening 206 for mixing the ice-cream/yogurt.

18. The dispenser of claim 9, wherein the capsule dispenser is one of a semi-hydraulic capsule dispenser or a completely automatic capsule dispenser.

19. A capsule dispenser for dispensing the capsule, said capsule dispenser is designed to be installed in a separated and independent freezer unit designed to maintain a pre-defined serving temperature of a ready-to-eat ice-cream/yogurt and to be installed in a door of a freezer chamber or in a door of a refrigerator chamber, said capsule dispenser comprising:
   a main body having: two or more compartments 310 designed to hold a plurality of disposable capsules 201 with said ready-to-eat ice-cream/yogurt, and a capsule receiver 205 with an exit opening 206 through which said ready-to-eat ice-cream/yogurt discharges, wherein said exit opening 206 comprises a one-way seal/gasket that allows said ice-cream/yogurt to exit while preventing cold/freezing air from exiting;
   a hydraulic/electric/pneumatic piston or plunger 203 designed to move up and down for pushing said ready-to-eat ice-cream/yogurt from said capsule 201; and
   a mixer rod 103 located at or in proximity to said exit opening 206 for mixing the ice-cream/yogurt,
   wherein said independent freezer unit comprises a door 501 to enable refilling new capsules 201 into the dispenser and to prevent said cold/freezing air from exiting said freezer device.

20. The capsule dispenser for dispensing the capsules of claim 19, further comprising:
   an electric capsule transport system designed to grab/hold and deliver a single capsule 201 from compartment to said capsule receiver 205, said system comprises a capsule holder 202 and an engine.

21. The capsule dispenser of claim 19, further comprising:
   a rail 210 acting as a capsule transport system designed to deliver a single capsule 201 from compartment to said capsule receiver 205;
   a bracket 320 designed for holding the capsule 201 when the piston 203 pushes said ready-to-eat ice-cream/yogurt out of the capsule 201.

* * * * *